(12) United States Patent  (10) Patent No.: US 8,913,474 B2
Taguchi et al.  (45) Date of Patent: Dec. 16, 2014

(54) OPTICAL INFORMATION RECORDING/REPRODUCING APPARATUS

(71) Applicants: Hitachi-LG Data Storage, Inc., Tokyo (JP); Hitachi Consumer Electronics Co., Ltd., Tokyo (JP)

(72) Inventors: Hirofumi Taguchi, Tokyo (JP); Kouji Fujita, Tokyo (JP); Taku Hoshizawa, Tokyo (JP); Ukyo Ikeda, Tokyo (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/242,910

(22) Filed: Apr. 2, 2014

(65) Prior Publication Data

US 2014/0301176 A1  Oct. 9, 2014

(30) Foreign Application Priority Data

Apr. 5, 2013 (JP) .................................. 2013-079118

(51) Int. Cl.
*G11B 7/00* (2006.01)

(52) U.S. Cl.
USPC .................................................... 369/112.02

(58) Field of Classification Search
None
See application file for complete search history.

(56) References Cited

U.S. PATENT DOCUMENTS

| RE37,717 E * | 5/2002 | Eguchi et al. ................. 359/739 |
| 2001/0048809 A1* | 12/2001 | Kajiyama et al. ............. 386/126 |
| 2010/0014065 A1* | 1/2010 | Gruner et al. .................. 355/67 |

FOREIGN PATENT DOCUMENTS

| JP | 11-242827 A | 9/1999 |
| JP | 2004-30726 A | 1/2004 |
| JP | 2006-172582 A | 6/2006 |
| JP | 2007-4041 A | 1/2007 |

* cited by examiner

*Primary Examiner* — Paul Huber
(74) *Attorney, Agent, or Firm* — Antonelli, Terry, Stout & Kraus, LLP.

(57) ABSTRACT

An optical information recording/reproducing apparatus for recording information on a recording medium and/or reproducing information from the recording medium, includes: a laser light source for performing recording and/or reproducing information; a shielding part, using a liquid crystal, that can switch between transmission and interception of laser light emitted from the laser light source; a driving circuit for driving the switching between transmission and interception of the shielding part; a moving part for relatively moving the shielding part and the laser light; and a controlling circuit for controlling the moving part. The moving part relatively moves the shielding part and the laser light so as to switch a region to which the laser light is applied from a first region of the shielding part to a second region thereof different from the first region, in order to prevent the liquid crystal from deteriorating.

16 Claims, 29 Drawing Sheets

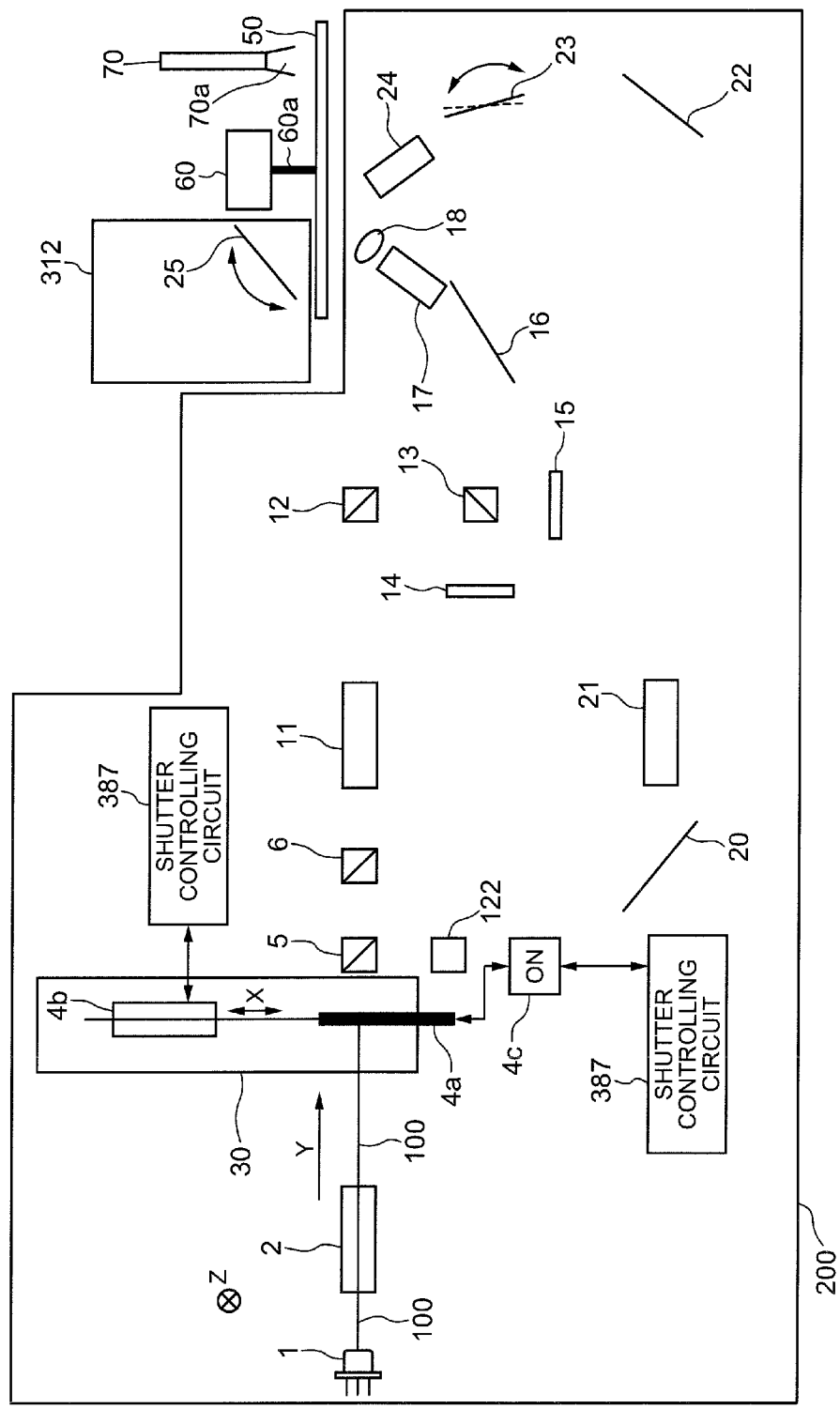

FIG. 7

|  | MODE | LIQUID CRYSTAL SHUTTER ON OR OFF | SHUTTERING (SHIELDING) FUNCTION |
|---|---|---|---|
| (1) | TURNING ON | ON | ON |
| (2) | STAND-BY | | |
| (3) | LOADING | | |
| (4) | CURING | | |

FIG. 8

|  | MODE | | LIQUID CRYSTAL SHUTTER ON OR OFF | SHUTTERING (SHIELDING) FUNCTION |
|---|---|---|---|---|
| (5) | RECORDING | (5-1) NORMAL RECORDING | OFF | OFF |
| | | (5-2) MOVING PAGE MOVING BOOK | ON | ON |

FIG. 9

|  | MODE | LIQUID CRYSTAL SHUTTER ON OR OFF | SHUTTERING (SHIELDING) FUNCTION |
|---|---|---|---|
| (6) | REPRODUCING | OFF | OFF |

STEP1

OPTICAL INFORMATION RECORDING/REPRODUCING APPARATUS

INCORPORATION BY REFERENCE

The present application claims priority from Japanese application JP 2013-079118 filed on Apr. 5, 2013 the content of which is hereby incorporated by reference into this application.

BACKGROUND OF THE INVENTION

The present invention relates to an apparatus and a method for reproducing information from a recording medium by using holography.

At present, by a Blu-ray Disc™ standard using a blue-violet semiconductor laser, optical discs having a storage capacity of about 50 GB can be commercialized for general use. In the future, optical discs are desired to have increased capacities as much as those of HDDs (Hard Disk Drive) of 100 GB to 1 TB.

However, to realize such an ultra-high density by an optical disc, a high-density technique by another new method is required the method unlike high-density techniques of making a laser have a short wavelength and making an objective lens have a high NA (Numerical Aperture).

Amid studies for next generation storage technology are being conducted, attention is being given to a hologram recording technique of recording digital information by using holography.

The hologram recording technique is a technique in which a signal beam having information on page data that is two-dimensionally modulated by a spatial light modulator is superposed on a reference beam inside a recording medium, and refractive index modulation occurs inside the recording medium by an interference fringe pattern that is generated at this point, to record the information on the recording medium.

At the time of reproducing the information, applying the reference beam used at the time of recording to the recording medium causes the hologram recorded in the recording medium to function like a diffraction grating to generate a diffracted beam. The diffracted beam is reproduced as a single beam of light including the recorded signal beam and phase information.

The reproduced signal beam is quickly and two-dimensionally detected by using a photodetector (camera) such as a CMOS and a CCD. In such a manner, the hologram recording technique can record two-dimensional information on an optical recording medium in a single hologram at once, and can reproduce the information, which can overwrite a plurality of pieces of page data at a certain portion in the recording medium, achieving high-capacity and high-speed recording/reproducing of information.

JP-A-2006-172582 (Patent Literature 1) discloses the hologram recording/reproducing technology, for example. This publication describes that "In addition, a mechanical shutter 25 for opening/closing a beam at the time of recording is disposed between an half-wave plate 24 and a polarizing beam splitter 26, and a period of recording time is determined by the timing of opening/closing the mechanical shutter 25."

In addition, JP-A-2007-4041 (Patent Literature 2) discloses the hologram recording/reproducing technology, for example. This publication describes that "A pattern providing such polarized light that all of the signal light 100 are shut off by a polarizing plate 14 during a period between data recording and data recording is displayed on a spatial modulator (SLM) 13 for performing spatial modulation of the signal light 100. As a result, a hologram recording material 50 is no longer irradiated with the signal light 100 between the recording and the recording, and therefore, the continuation of the useless recording on the hologram recording material 50 can be prevented. Also, the spatial modulator 13 functions as the shutter but the operation is rapid and does not generate the vibrations and therefore, the exact signal can be recorded and the transfer rate can be made higher."

In addition, JP-A-2004-30726 (Patent Literature 3) is disclosed, for example. This publication describes that "As a method for minimizing spherical aberration, a method or the like can be employed in which a wave surface on a liquid crystal element 20 is adjusted so as to minimize jitter components generated due to spherical aberration while signals recorded in an optical recording medium 10 disc are reproduced."

In addition, JP-A-11-242827 (Patent Literature 4) describes that "In addition, since a liquid crystal shutter 14 is a liquid crystal shutter configured by a plurality of pixels, any portion of feedback light incident on a detector 11 can be shielded by controlling the individual pixels. As a result, for example, even when an objective lens 6 is shifted and an optical axis thereof deviates, which moves a portion including much of information on a guiding groove edge region 73, a light-shielding position can be moved, accordingly."

SUMMARY OF THE INVENTION

Now, using a mechanical shutter described in Patent Literature 1 raises problems as follows. First, when holograms are quickly recorded on a disc to increase a transfer rate, high-speed operation is limited due to the inertia of the mechanical shutter itself, and opening/closing of the shutter cannot follow a desired speed. Second, the mechanical shutter generates unnecessary vibration with respect to beam light at the time of high-speed opening/closing or high-speed operations of retracting and inserting. If holograms are recorded on the disc in the presence of vibration, there is turbulence in the wave surface to be recorded, which makes accurate recording of information signals difficult. Thus, recording/reproducing has to be started after generation of the vibration is suppressed, which makes supporting of high-speed recording difficult. In the worst case, desired signals cannot be recorded at all. As a result, it takes some time for opening/closing the mechanical shutter, leading to the decrease in the transfer rate.

Thus, Patent Literature 2 discloses a configuration, in a shutter for selecting whether or not to record data, which includes a combination of a liquid crystal display device and a polarizing plate so as to have a shutting function as appropriate, rather than a mechanical shutter that may generate vibration.

However, there are concerns about deterioration of life from a viewpoint of light resistance when the liquid crystal element is used as a shutter in a hologram recording/reproducing apparatus because the liquid crystal element is disposed in an optical path of a light beam of the laser, and the liquid crystal element always receives the light beams, which brings the liquid crystal element into a "burned" state.

In addition, in Patent Literature 3, there are also concerns about the liquid crystal element to be damaged because a liquid crystal element is shifted as the objective lens moves, and the liquid crystal element always receives light through the objective lens, which brings the liquid crystal element into the "burned" state by the light beam if the power of the light is strong, as with Patent Literature 2.

In addition, in Patent Literature 4, although the position of the light beam moves as the objective lens moves, irradiated position on the liquid crystal element substantially remains at the same position, and it is therefore difficult to avoid the "burned" state of the liquid crystal element, as with Patent Literature 3.

Thus, the present invention is disclosed in light of the problems, and the present invention has an object to provide an optical information recording/reproducing apparatus including a shutter unit that enables long-lasting and high-speed recording/reproducing when a liquid crystal element is used as a shutter, and to provide an optical information recording/reproducing method.

The abovementioned problems can be solved with the invention described, for example, in claims.

According to the present invention, an optical information recording/reproducing apparatus including a shutter unit that enables long-lasting and high-speed recording/reproducing, and an optical information recording/reproducing method can be realized.

Other objects, features and advantages of the invention will become apparent from the following description of the embodiments of the invention taken in conjunction with the accompanying drawings.

BRIEF DESCRIPTION OF THE DRAWINGS

FIG. 2 is a schematic view illustrating the first embodiment of the optical pickup in the optical information recording/reproducing apparatus according to the present invention;

FIG. 7 is a schematic view illustrating the first embodiment of the optical pickup in the optical information recording/reproducing apparatus according to the present invention;

FIG. 8 is a schematic view illustrating the first embodiment of the optical pickup in the optical information recording/reproducing apparatus according to the present invention;

FIG. 9 is a schematic view illustrating the first embodiment of the optical pickup in the optical information recording/reproducing apparatus according to the present invention;

DESCRIPTION OF THE EMBODIMENTS

The embodiments of the present invention will be described below with reference to the drawings.

Embodiment 1

Figure 4:
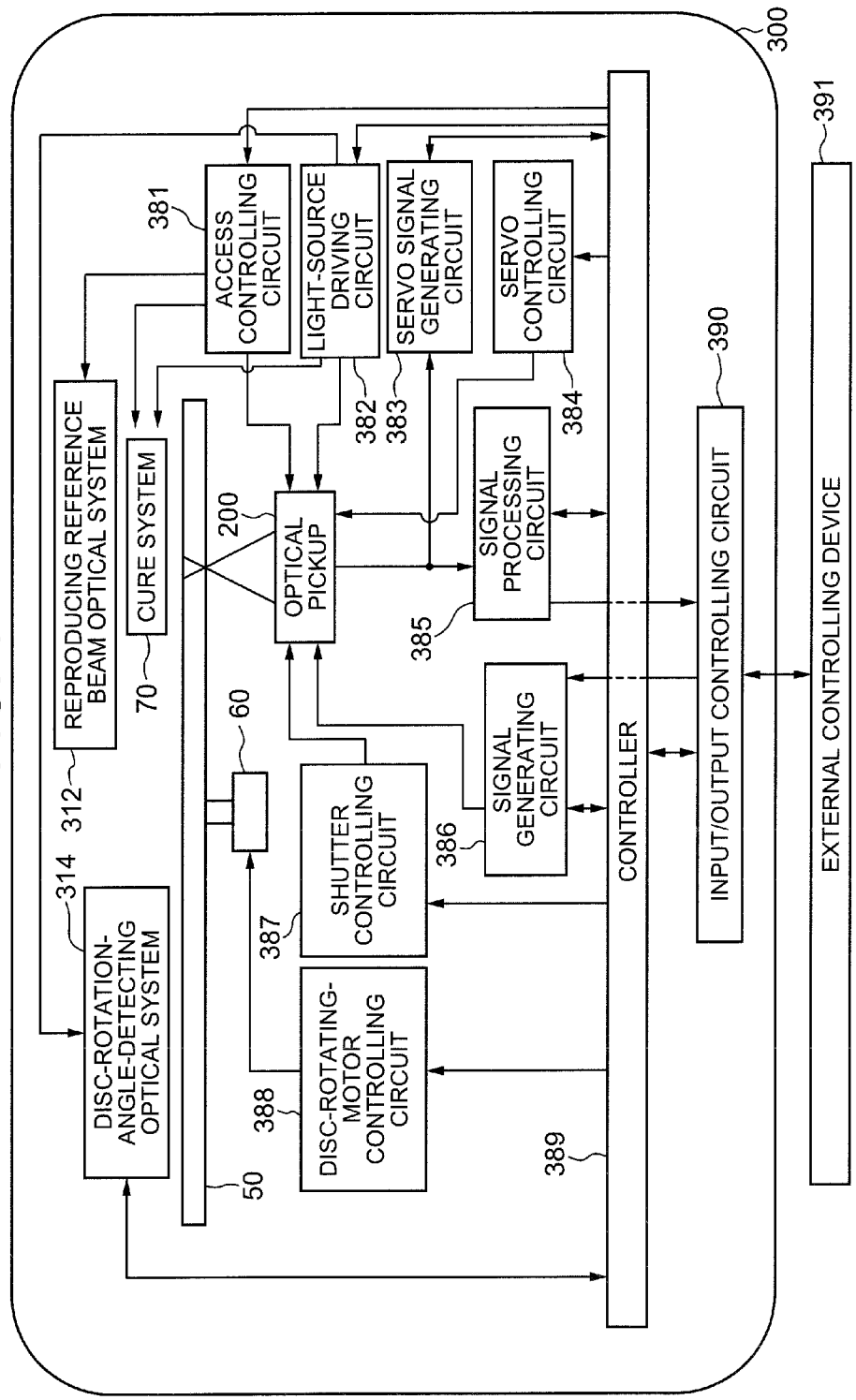
FIG. 4 is a block diagram showing an overview of the entire optical information recording/reproducing apparatus of the first embodiment according to the present invention.

The embodiment of the present invention will be described with reference to the accompanying drawings. FIG. 4 is a block diagram showing an optical information recording/reproducing apparatus using an optical information recording medium that records and/or reproduces digital information by using holography.

An optical information recording/reproducing apparatus 300 is connected to an external controlling device 391 via an input/output controlling circuit 390. At the time of recording, the optical information recording/reproducing apparatus 300 receives information signals to be recorded from the external controlling device 391 through the input/output controlling circuit 390. In addition, at the time of reproducing, the optical information recording/reproducing apparatus 300 transmits reproduced information signals to the external controlling device 391 through the input/output controlling circuit 390.

The optical information recording/reproducing apparatus 300 includes an optical pickup 200, a reproducing reference beam optical system 312, a disc 50 being an information recording medium, and a motor 60 to rotate the disc 50, a disc-rotation-angle-detecting optical system 314, and a cure system 70, and the disc 50 is configured to be rotated by the motor 60.

The optical pickup 200 (the details thereof will be described hereafter) serves a function of applying a reference beam and a signal beam to the disc 50 to record digital information on the disc 50 by making use of holography. At this point, the information signals to be recorded are transmitted to a spatial light modulator (hereafter referred to as SLM) in the optical pickup 200 by a controller 389 via a signal generating circuit 386, and the signal beam is modulated by the spatial light modulator.

When the information recorded in the disc 50 is reproduced, the reproducing reference beam optical system 312 generates a light wave that causes a reference beam emitted from the optical pickup 200 to enter the optical information recording medium. The reproduced beam reproduced by the reproducing reference beam is detected by a photodetector (hereafter, referred to as camera) to be described hereafter in the optical pickup 200, and a signal thereof is reproduced by a signal processing circuit 385.

A period of irradiation time of the reference beam (of reference numeral 111, to be described hereafter) which is applied to the disc 50, and the signal beam (of reference numeral 101) can be adjusted by the controller 389 controlling a period of opening/closing time of the shutter part 30 in the optical pickup 200 via a shutter controlling circuit 387.

The cure system 70 serves a function of generating a curing light beam (of reference character 70a, to be described hereafter) used for pre-curing and post-curing the disc 50. The pre-curing means an upstream process of applying a predetermined light beam in advance at the time of recording information to a desired position in the disc 50, so as to achieve activation or the like of the disc before applying the reference beam and the signal beam to the desired position. The post-curing means a downstream process of applying a predetermined light beam for fixing, so as to disable the desired position to be overwritten with the other information, after recording the information to the desired position in the disc 50.

The disc-rotation-angle-detecting optical system 314 is used for detecting a rotation angle of the disc 50. When the disc 50 is adjusted to a predetermined rotation angle, the disc-rotation-angle-detecting optical system 314 detects a signal corresponding to a rotation angle, and the controller 389 controls the rotation angle of the disc 50 using the detected signal, via a disc-rotating-motor controlling circuit 388.

A light-source driving circuit 382 provides a predetermined light-source driving current to light sources in the optical pickup 200, the cure system 70, and the disc-rotation-angle-detecting optical system 314, and the light sources each emit a light beam of a predetermined light intensity.

In addition, a mechanism (not shown) for sliding a position of the disc 50 in a radial direction thereof with respect to the optical pickup 200 and the cure system 70 for a disc, is provided, which performs position control to the disc via an access controlling circuit 381.

Now, a recording technique using a principle of angular multiplexing in holography has a tendency to have an extremely small tolerance for a deviation of a reference beam angle.

It is thus required to provide a mechanism for detecting the amount of deviation of the reference beam angle, in the optical pickup 200, so as to cause the servo signal generating circuit 383 to generate servo controlling signals, and to provide a servo mechanism for correcting the amount of deviation via a servo controlling circuit 384, in the optical information recording/reproducing apparatus 300.

Here, the optical pickup 200, the cure system 70, and the disc-rotation-angle-detecting optical system 314 may each have a configuration in which some of the optical system configurations or all of the optical system configurations are integrated into one simplified configuration.

Figure 1:
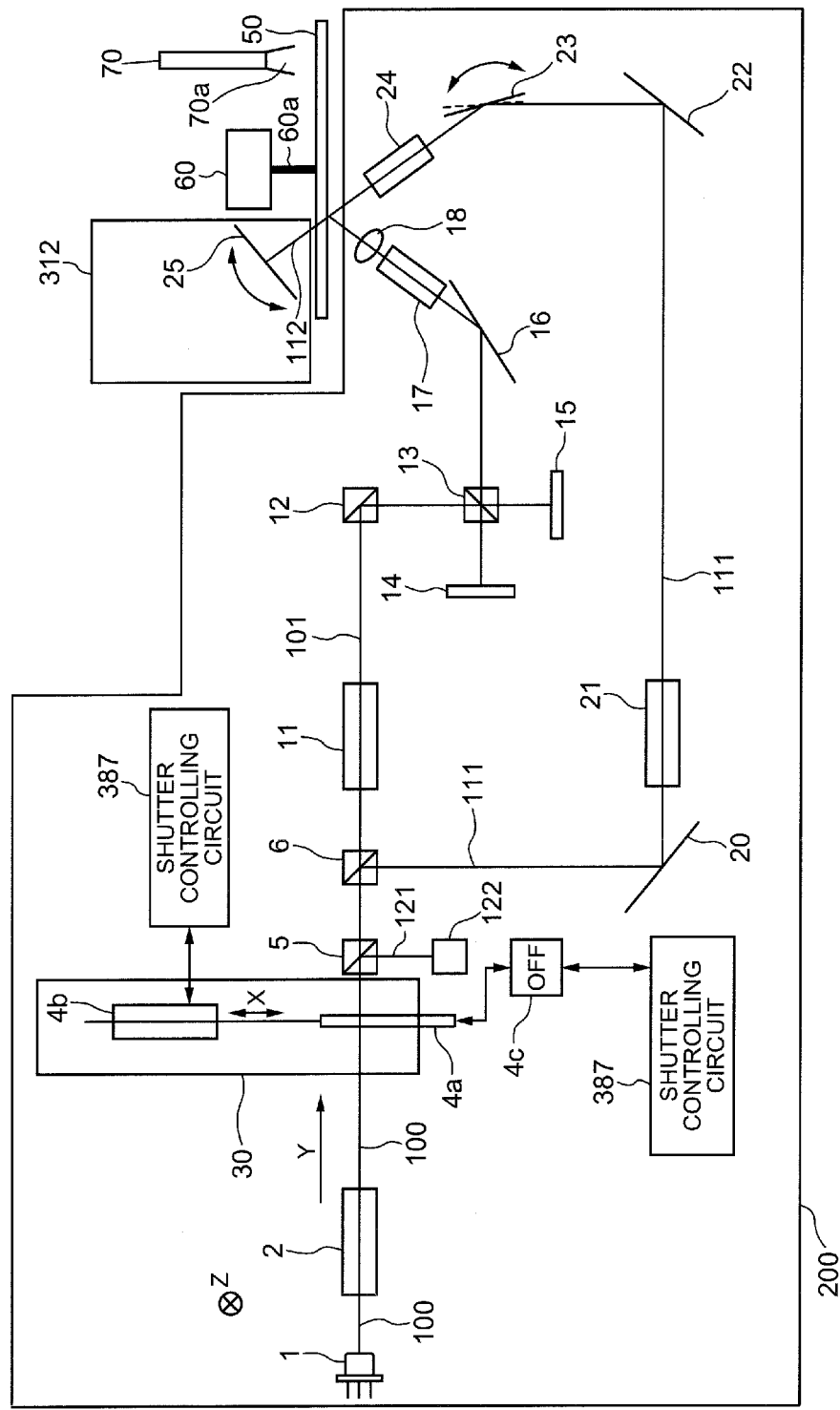
FIG. 1 is a schematic view illustrating a first embodiment of an optical pickup in an optical information recording/reproducing apparatus according to the present invention.

FIG. 1 shows a recording principal in one example of a basic optical system configuration of the optical pickup 200 that in the optical information recording/reproducing apparatus 300 (abovementioned in FIG. 4) illustrating the first embodiment of the present invention. In this drawing, for the description, a Z direction is illustrated as a direction perpendicular to the plane of paper, a Y direction is illustrated as a traveling direction of the light beam 100 (perpendicular to the Z direction), and an X direction is illustrated as a direction substantially perpendicular to both of the Z direction and the Y direction.

The light beam 100 emitted from the laser light source 1 passes through the optical system 2 and enters the shutter part 30. Here, the shutter part 30 is formed by a liquid crystal shutter 4a using a liquid crystal element and an actuator 4b for moving the liquid crystal shutter 4 physically in a sliding manner, and has a structure in which the liquid crystal shutter 4a can move with respect to the light beam 100 in the X direction, by an actuator to be described hereafter. In addition, a prism 5 is disposed at the rear of the liquid crystal shutter 4a. The shutter part 30 has a function of intercepting a beam light in combination with the prism 5 when the liquid crystal shutter 4a is brought into an ON state (FIG. 1 shows an OFF state) by a liquid-crystal ON/OFF-controlling circuit 4c.

The light beam 100 passing through the prism 5 is branched in light that travels straight toward a PBS (Polarization Beam Splitter) prism 6 to be described hereafter, and light 121 that is bend toward a substantially perpendicular to the traveling direction by the prism 5, and it is detected whether or not the shutter part 30 performs a predetermined operation by detecting, for example, the intensity of the light 121 by a sensor 122. The sensor 122 may be a sensor that can detect a state or an operation of the shutter part, and a type, a structure, and a detection method are not specially limited. One example of the sensor may include a typical light receiving element, photodetector, front monitor or the like. FIG. 2 shows the case where the liquid crystal shutter 4a is in the ON state in FIG. 1.

Figure 3A:
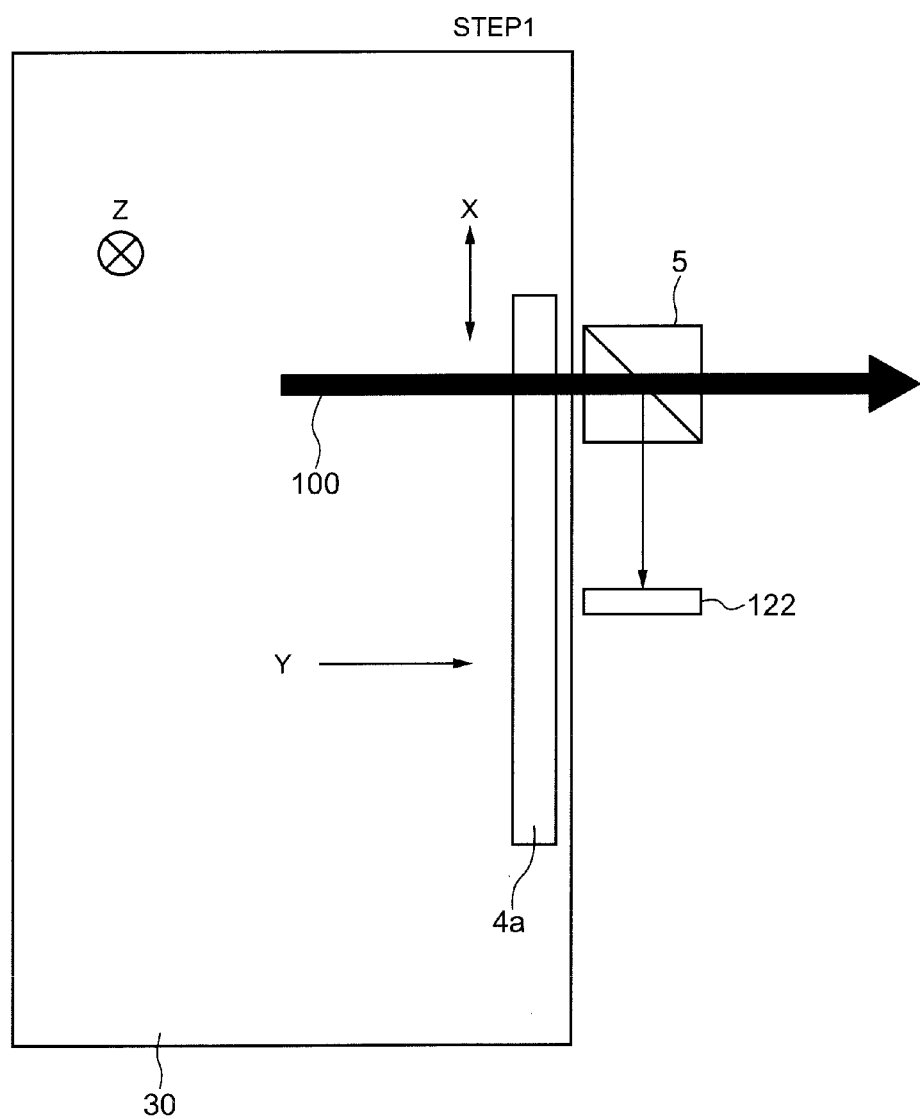
FIG. 3A is a schematic view illustrating the first embodiment of the optical pickup in the optical information recording/reproducing apparatus according to the present invention.
Figure 3B:
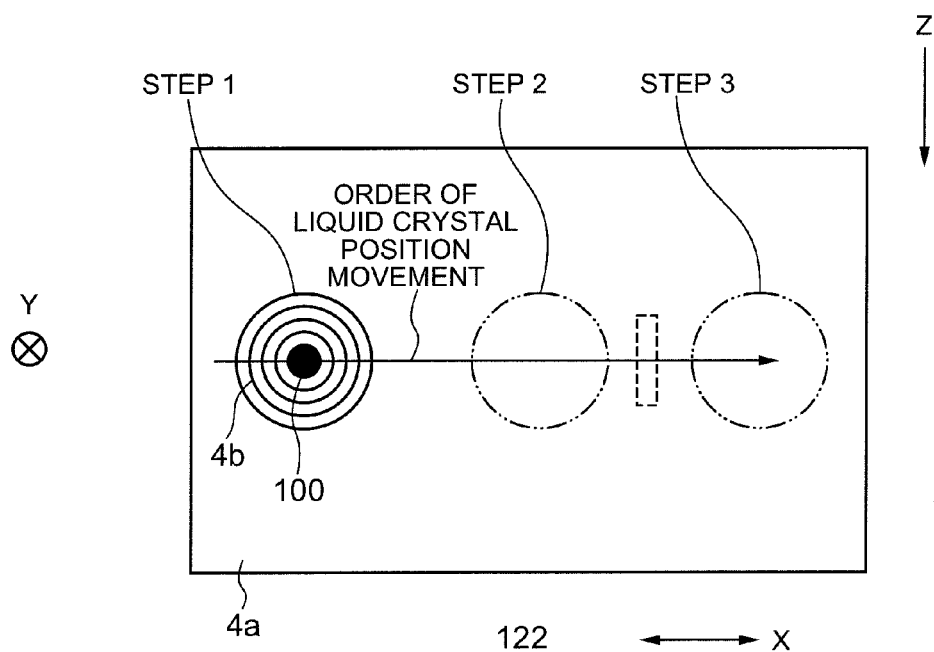
FIG. 3B is a schematic view illustrating the first embodiment of the optical pickup in the optical information recording/reproducing apparatus according to the present invention.

For the purpose of the description here, extracted diagrams of the shutter part 30 of FIG. 1 are shown in FIG. 3A and FIG. 3B. FIG. 3A is a diagram of the shutter part 30 viewed toward the plane of paper, that is, in the Z direction, FIG. 3B is a diagram of the shutter part 30 viewed in an arrow Y direction in FIG. 1 and FIG. 3A. In FIG. 3B, the prism 5 is positioned downstream of the liquid crystal shutter 4, and is hidden behind the liquid crystal shutter in this drawing. Here, the liquid crystal shutter 4a is in the OFF state. FIGS. 3A and 3B show the state where the light beam 100 is near the edge of the liquid crystal shutter 4a (STEP1 in FIG. 3B). In addition, a circle group 4b concentrically illustrated about the light beam 100 in STEP1 of FIG. 3B schematically shows a region on the liquid crystal shutter 4a that is subjected to damage by the light beam 100.

Here, in the state of FIG. 1, that is, when the liquid crystal shutter 4a is in the OFF state, the light beam 100 passes through the shutter 30, and through the prism 5 disposed at the rear of the shutter. The light beam 100 enters the PBS (Polarization Beam Splitter) prism 6 after the polarization direction thereof is thereafter controlled, by an optical element or the like (not shown) formed by a half-wavelength plate or the like, for example, such that a ratio between p polarization light intensity and s polarization light intensity becomes a desired ratio.

Here, the shutter part 30 of the present embodiment will be described in detail. The shutter part 30 is formed by the liquid crystal shutter 4a that uses a liquid crystal element to transmit and intercept the light beam, the liquid-crystal ON/OFF-controlling circuit 4c for performing ON/OFF control of the liquid crystal shutter 4a, the shutter controlling circuit 387 for controlling the liquid-crystal ON/OFF-controlling circuit 4c, and is further formed by the liquid crystal shutter moving actuator 4b for (mechanically) moving the liquid crystal shutter 4a with respect to an optical path of the beam light 100, in an arrow X direction, and the shutter controlling circuit 387 for controlling the actuator 4b. Note that, for simplification, there has been described that the controls of the actuator 4b, the liquid-crystal ON/OFF-controlling circuit 4c are performed by the shutter controlling circuit 387, but of course, these controls may be performed by separated circuits. Here, the shutter controlling circuit 387 is the same as that described in FIG. 4.

With these configurations, as described above, the liquid crystal shutter 4a can move in the X direction while performing control of shielding and transmitting the light beam 100.

In addition, there is a problem with a liquid crystal element configuring the liquid crystal shutter 4a, in which a composition configuring the liquid crystal does not change in a state where a laser has not been applied, but once the laser is applied, the composition thereof starts to be broken and damaged as a panel of the liquid crystal, and the function as the shutter consequently gradually deteriorates.

In addition, an operation pattern of the liquid crystal shutter 4a will be described in detail hereafter. The description of the one example of the recording principal in the basic optical system configuration of the optical information recording/reproducing apparatus 300 will be continued with reference to FIG. 1.

In FIG. 1, the light beam 100 passing through the shutter part 30 is branched in the signal beam 101 and the reference beam 111 by the PBS prism 6. Next, the light beam passing through the PBS prism 6 serves as the signal beam 101, passes through PBS prisms 12 and 13 via a phase shift mask and a relay lens, and enters an SLM 15, after a light beam diameter thereof is enlarged by an optical system 11, for example, a beam expander (not shown).

The signal beam having information added by the SLM 15 is reflected by the (PBS) prism 13 and passes through an optical system 17 via, for example, a mirror 16 to adjust the optical path thereof. Here, the optical system 17 has a configuration including, as one example, a relay lens (not shown) and a spatial filter 314. The signal beam 101 thereafter converges into the disc 50 by an objective lens 18.

On the other hand, the light beam reflected on the PBS prism 6 serves as the reference beam 111, passes through the optical system 21 formed by a polarization direction converting element or the like (not shown), so as to be set at a predetermined polarization direction for recording or reproducing after the direction thereof is changed by a mirror 20, and enters a galvanometer mirror 25 via a mirror 22. Since an angle of a galvanometer mirror 23 can be adjusted by an actuator (not shown), an incident angle of the reference beam incident on the disc 50 after passing through an optical system 24 can be set at a desired angle. Note that, to set the incident angle of the reference beam, elements for converting the wave surface of the reference beam may be used instead of the galvanometer mirror.

In such a manner, the entrance of the signal beam and the reference beam into the disc 50 superposing on each other forms an interference fringe pattern in the disc 50 being a recording medium, and two-dimensional information is recorded by writing this pattern in the recording medium. In addition, the incident angle of the reference beam incident on the disc 50 can be changed by the galvanometer mirror 23, which enables recording by the angular multiplexing.

Hereafter, with respect to holograms recorded on a single region at different reference beam angles, a hologram corresponding to an individual reference beam angle is defined as a page, and a set of the pages that are recorded in an angular multiplexing manner in the single region is defined as a book.

There has been described the recording principal in the optical information recording/reproducing apparatus 300 in FIG. 1, and the description of the reproduction principal in the one example of the basic optical system configuration of optical pickup 200 in the optical information recording/reproducing apparatus 300 will be subsequently described with reference to FIG. 5. In reproducing, the signal beam 101 is intercepted by a signal beam shutter (not shown) on its way at the time of passing through the optical system 11. Here, examples of the signal beam shutter include a douser, a mechanical shutter using a shielding blade, and/or a liquid crystal shutter using a liquid crystal element. In addition, the control of the signal beam shutter may be performed by the shutter controlling circuit 387, or may be performed by a signal beam shutter dedicated controlling circuit (not shown).

In reproducing the recorded information, as described above, the reference beam 111 is incident on the disc 50, and the light beam passing through the disc 50 is caused to reflect on the galvanometer mirror 25 whose angle can be adjusted by an actuator (not shown), to generate the reproducing reference beam thereof.

The reproduced beam reproduced by the reproducing reference beam propagates through the objective lens 18, a relay lens (not shown), and the optical system 17 formed by a spatial filter or the like. The reproduced beam thereafter passes through the (PBS) prism 13 and enters a photodetector (hereafter referred to as camera) 14, which enables the recorded signals to be reproduced. As the camera 14, an imaging element such as a CMOS image sensor and a CCD image sensor can be used, but any element that can reproduce the page data may be used.

As described above, at the time of reproducing or recording, it is possible that the light beam 100 is also applied to the liquid crystal shutter 4a of the shutter part 30, at the time of the irradiation. The liquid crystal shutter 4a is therefore affected by the light beam 100, striking the light beam at the same position all the time gradually damages the constitution of the liquid crystal shutter 4a, which can impair the function of the liquid crystal shutter. Thus, the present invention monitors light passing through the liquid crystal shutter 4a, or includes a timer or a counter (not shown) for totaling the irradiation time of the light beam 100 to the liquid crystal shutter 4a, and applies the light beam to a new position different from the position to which the light beam has been applied at the timing when the liquid crystal shutter 4a is determined to be "damaged" and cannot satisfy the function as the liquid crystal shutter, so as to use an unused region in the liquid crystal shutter 4a. Although FIG. 1, FIG. 2, and FIGS. 3A and 3B show the state where the light beam 100 is applied to the liquid crystal shutter 4a at the edge portion thereof, FIG. 5 shows the state where the liquid crystal shutter 4a is moved along an arrow in the X direction by the actuator 4b to be controlled such a position as the light beam is applied to the substantially center of the liquid crystal shutter 4a. Here, in FIG. 5, the liquid crystal shutter 4a is in the OFF state (the state where the light beam passes therethrough). Note that there has been described that an unused region in the liquid crystal shutter 4a is used, but a substantially unused region where the liquid crystal shutter is available or an available region may be used. The determination of whether or not the region is the available region, may be provided by, for example, determining whether a reaction speed of the liquid crystal element forming the liquid crystal shutter 4a is equal to or higher than a predetermined value, or a transmission rate is equal to or higher than a predetermined value.

In addition, there will be now described one example of a procedure of determining that the composition configuring the liquid crystal element is damaged and spoiled due to the influence of the light beam in the liquid crystal shutter.

As described above, the optical information recording/reproducing apparatus 300 includes the sensor 122 for detecting, for example, beam light, downstream of the liquid crystal shutter, and part of the light beam 100 passing through the liquid crystal shutter 4a is led to the sensor 122. The optical information recording/reproducing apparatus may include, for example, means for storing the light intensity after energizing the apparatus to transmit the light beam through the liquid crystal shutter, the light intensity in the use state is compared with the initial light intensity, a degree of the transmission of light beam through the liquid crystal shutter is monitored, and the deteriorated state may be determined if the degree of the transmission is equal to or lower than a reference value (e.g., 80% or lower). Alternately, the light intensity in the use state is inversely compared with that in the initial shielding state, and the deterioration state may be determined if the degree of transmission is equal to or higher than the reference value (e.g., 20% or higher, this indicates that the light is leaked when the light should be shielded). Based on the determination, it is determined whether or not to move the position of the liquid crystal shutter. The reference value can be freely determined.

In addition, a method can be conceived, as another determination method, in which the optical information recording/reproducing apparatus includes storage means such as a memory for accumulating a period of irradiation time of the light beam to the liquid crystal shutter, so as to grasp how much the liquid crystal shutter is damaged for how long the light beam is applied to the liquid crystal shutter, in advance, and the position of the liquid crystal shutter is moved when the time has lapsed in the apparatus state. This method can be implemented without using a sensor such as that of reference numeral 122, providing an advantage of achieving a low cost.

In connection with this, the optical information recording/reproducing apparatus may include means (not shown) for storing portions to which the light beam has been applied and unused portions on the liquid crystal shutter, which allows for determining portions of the liquid crystal to which the light beam has not been applied.

Figure 5:
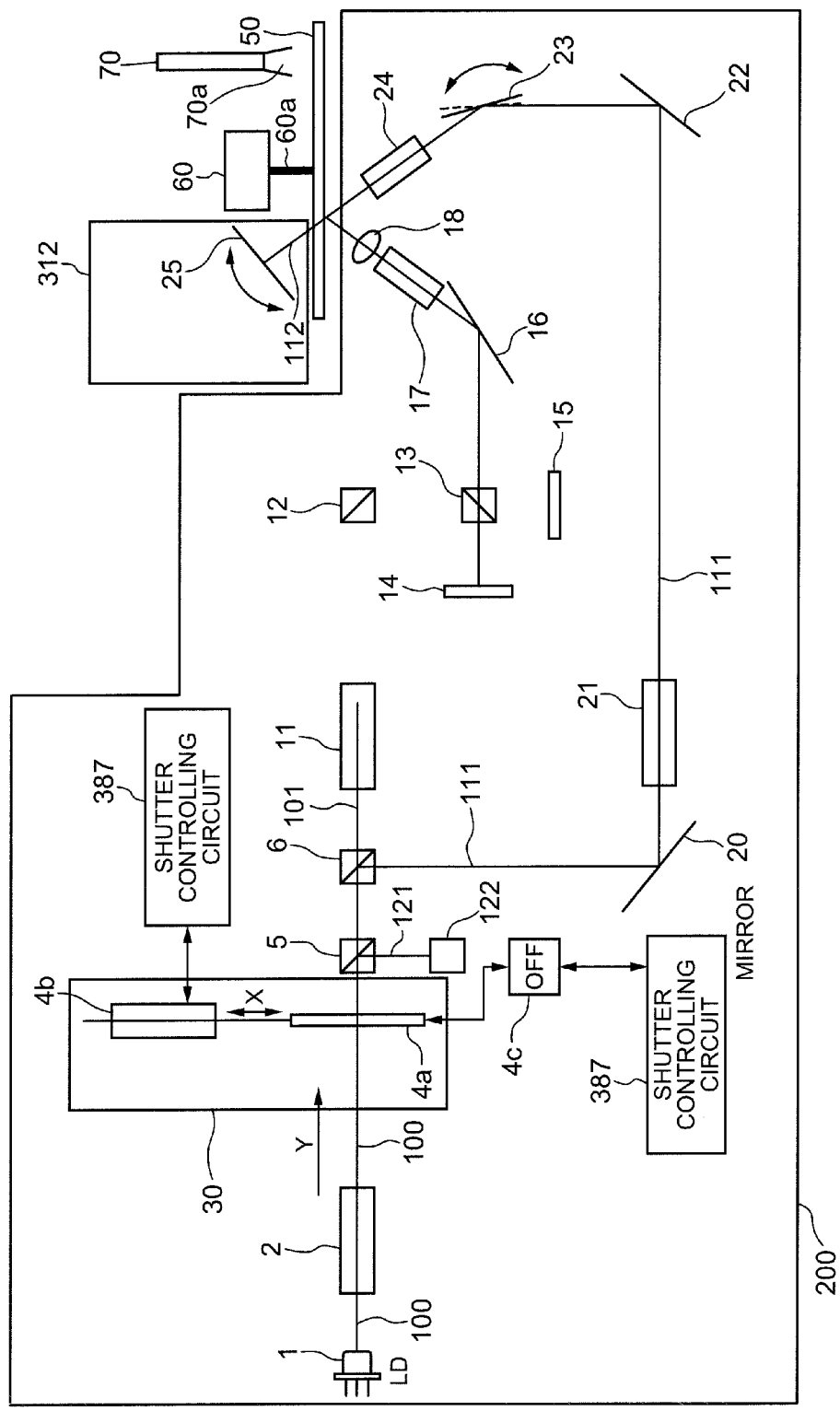
FIG. 5 is a schematic view illustrating the first embodiment of the optical pickup in the optical information recording/reproducing apparatus according to the present invention.

In addition, there has been described here the state where a curing light beam 70a is applied from the cure system 70 in FIG. 1, FIG. 2, and FIG. 5, for ease of the description, but the generation and irradiation of the curing light beam are typically performed at the timing of pre-curing and post-curing, as described above.

Hereafter, an operation mode of the liquid crystal shutter will be described in detail with reference to FIGS. 6A and 6B to FIG. 9.

Figure 6A:
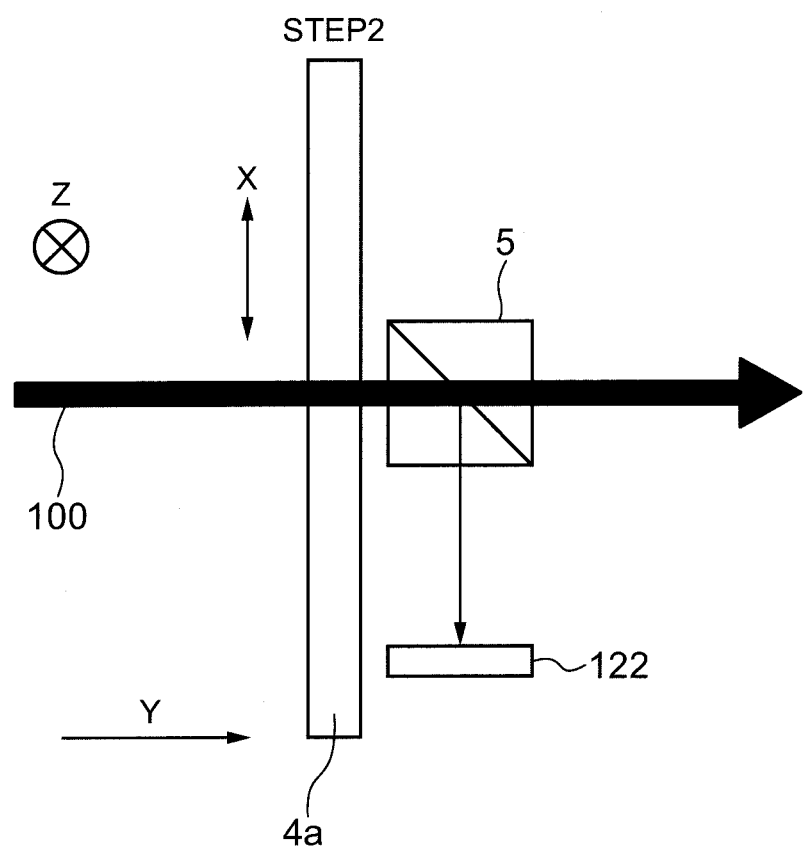
FIG. 6A is a schematic view illustrating the first embodiment of the optical pickup in the optical information recording/reproducing apparatus according to the present invention.
Figure 6B:
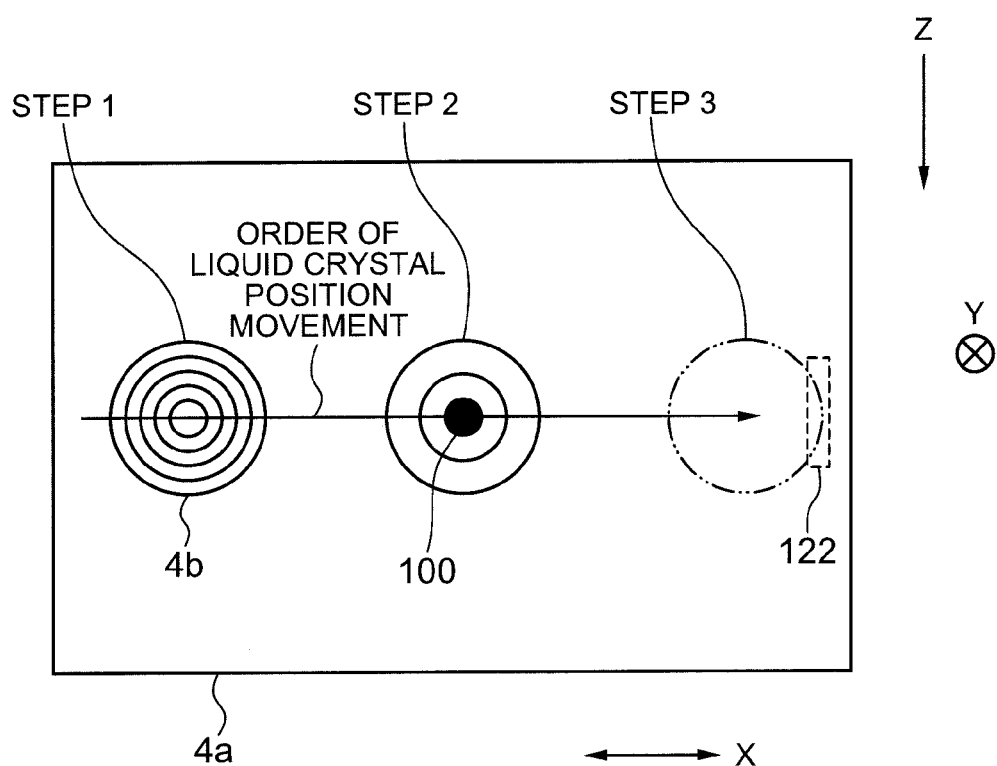
FIG. 6B is a schematic view illustrating the first embodiment of the optical pickup in the optical information recording/reproducing apparatus according to the present invention.

FIGS. 6A and 6B are extracted diagrams of the shutter part 30 surrounded by dotted lines in FIG. 1, FIG. 2, and FIG. 5, and FIG. 6A shows the state where the light beam 100 is applied to a substantially center portion of the liquid crystal shutter 4a. In addition, FIG. 6B is a diagram of FIG. 6A viewed in an irradiating direction of the light beam, that is, in the Y direction. FIG. 6B shows the state where STEP1 is the irradiated position of the light beam 100 on the liquid crystal shutter 4a in FIG. 1, of which liquid crystals has already deteriorated under the influence of the light beam. The circle group 4b schematically shows a region on the liquid crystal shutter 4a under the influence of damage by the light beam 100.

Thus, in STEP2, the position of the liquid crystal shutter 4a is moved in a left direction of an arrow X, where the liquid crystal shutter is not damaged by the light beam, by the actuator (not shown) (the position of beam light is not changed), such that the light beam can be applied to the vicinity of the relatively and substantially center portion of the liquid crystal shutter 4a. Subsequently, like in the state shown by STEP3 in FIG. 6B, when the liquid crystal shutter 4a is damaged by the light beam 100 also at the position of STEP2, the liquid crystal shutter is further moved to an unused region that has not been damaged or a portion that has been damaged little.

Here, desired states of the shutter for various modes of the optical information recording/reproducing apparatus will be organized and shown in FIG. 7 to FIG. 9, as one example. FIG. 7 shows:
(1) a mode where power is turned on and the apparatus itself is brought into the ON state for stabilizing the laser;
(2) a standby mode where the apparatus waits for recording or reproducing in the mode (1) after stabilizing the laser;
(3) a mode where a disc is loaded/unloaded on/from the apparatus; and
(4) a mode where the disc is cured,
for example, and in the modes (1) to (4), the liquid crystal shutter is controlled in the ON state because unnecessary light beams applied to the disc have to be intercepted, and the light beam is intercepted from the downstream of the shutter to the disc 50 (in the state of FIG. 2).

FIG. 8 is a diagram compiling states of the liquid crystal shutter at the time of recording, and FIG. 9 is a diagram compiling states of the liquid crystal shutter at the time of reproducing. FIG. 8 includes a plurality of patterns for the time of normal recording in which data is recorded on the disc 50, the time of page movement being a timing for switching pages for each unit of the data, and the time of book movement described above. Here, at the time of normal recording, needless to say, since the data should be recorded in the disc, the liquid crystal shutter has to be in an opened state (in the OFF state of the liquid crystal) to transmit the light beam.

On the other hand, if the light beam is applied to the disc at the time of page movement or book movement, segments of the data become indistinct, which causes the data not to be read from the disc 50 at the time of reproducing, and in this state, the liquid crystal shutter therefore needs to be brought into a closed state (in the ON state of the liquid crystal).

FIG. 9 is a diagram compiling the states of the liquid crystal shutter at the time of reproducing.

Here, since the reference beam 111 needs to be applied to the disc at the time of reproducing, the liquid crystal shutter 4a needs to be in the opened state (OFF state). In addition, as described above, since the signal beam 101 does not need to be applied at the time of reproducing, a shutter (not shown) configuring part of the optical system 11 is closed to intercept the signal beam 101 (in the state of FIG. 5). Since the signal beam shutter (not shown) of the optical system 11 does not need to be quickly operated, a mechanical shutter method may be employed therefor.

In addition, an operation flow of the liquid crystal shutter according to the present embodiment will be now described with reference to FIGS. 10A to 10D.

FIGS. 10A to 10D are operation flows of recording/reproducing in the optical information recording/reproducing apparatus 300 using holography.

Figure 10A:
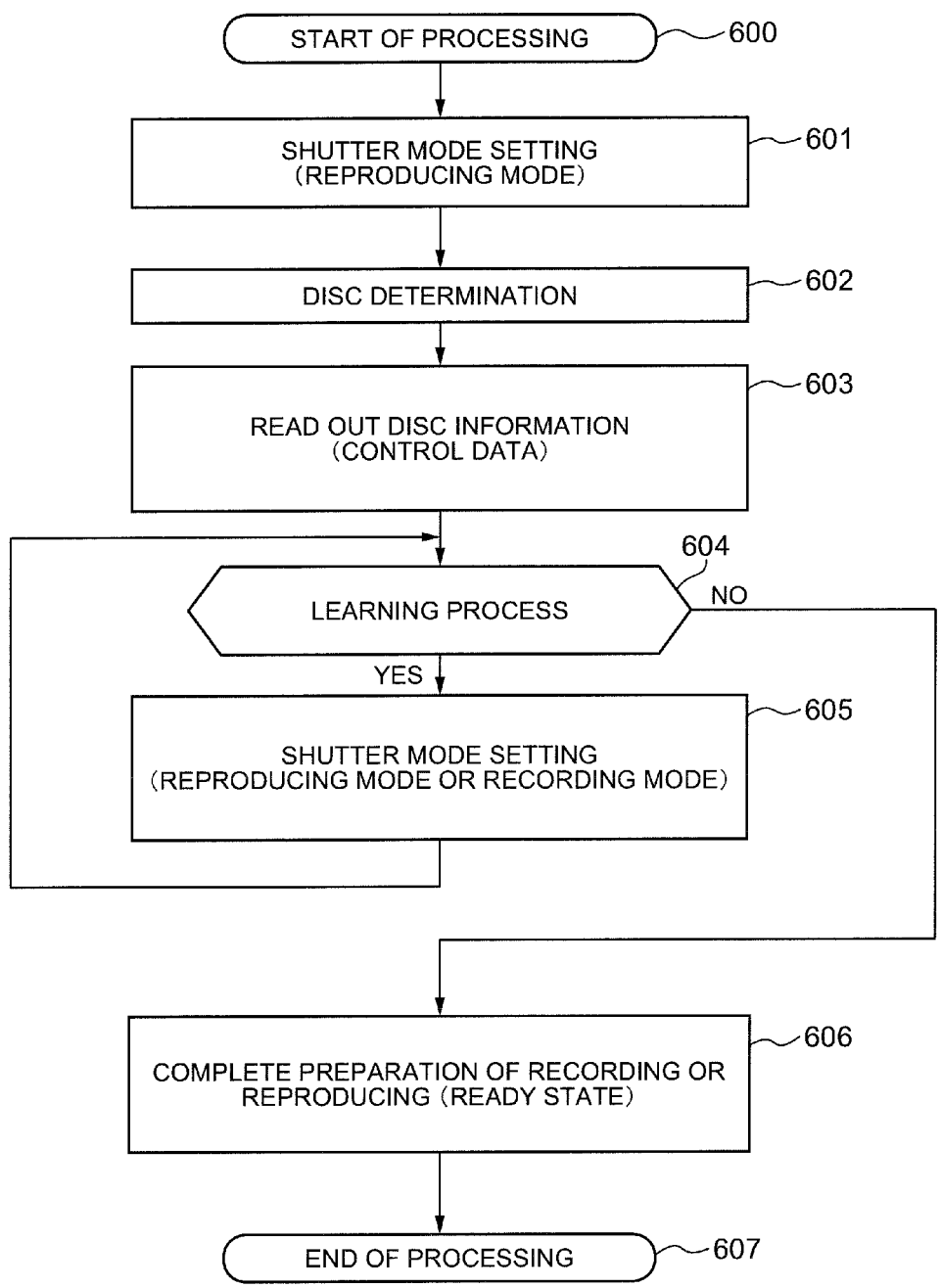
FIG. 10A is a diagram of an embodiment of an operation flow in the optical information recording/reproducing apparatus.
Figure 10B:
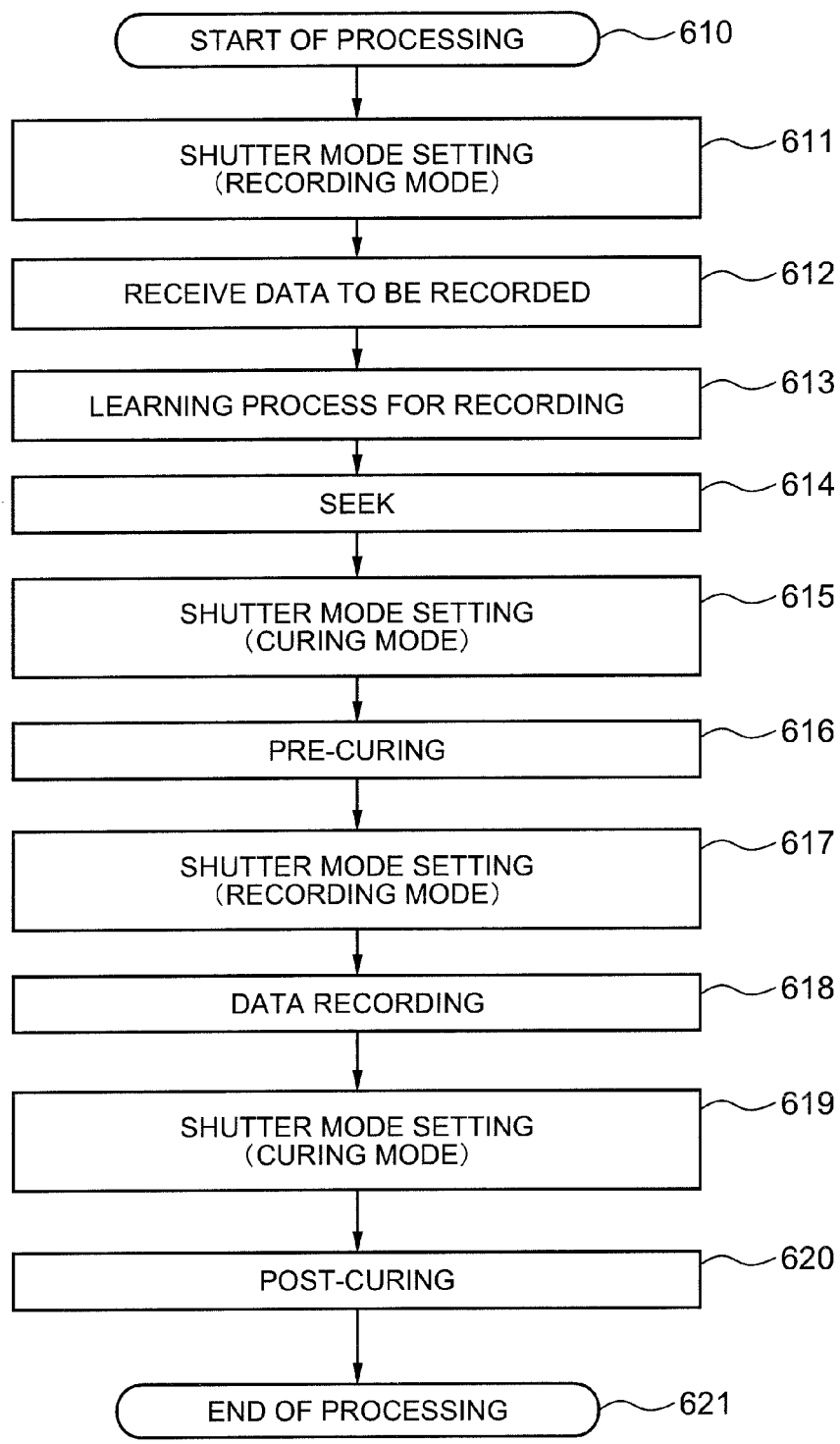
FIG. 10B is a diagram of an embodiment of the operation flow in the optical information recording/reproducing apparatus.
Figure 10C:
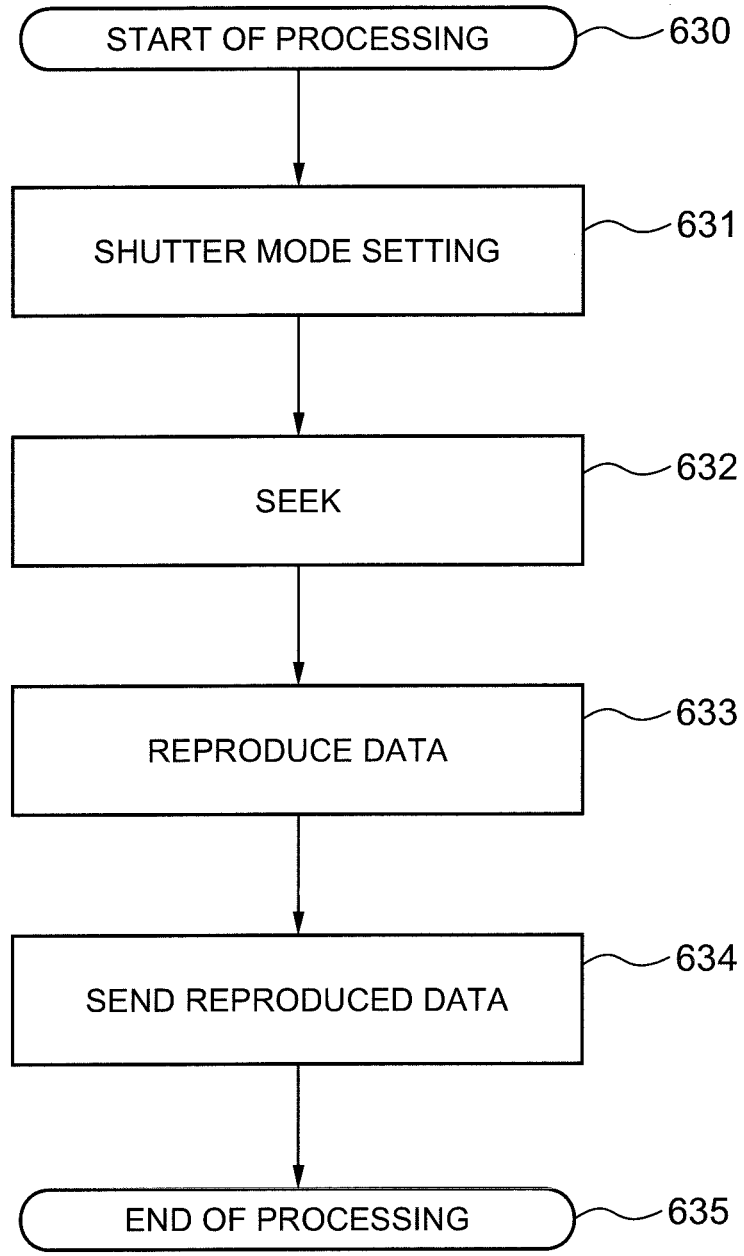
FIG. 10C is a diagram of an embodiment of the operation flow in the optical information recording/reproducing apparatus.
Figure 10D:
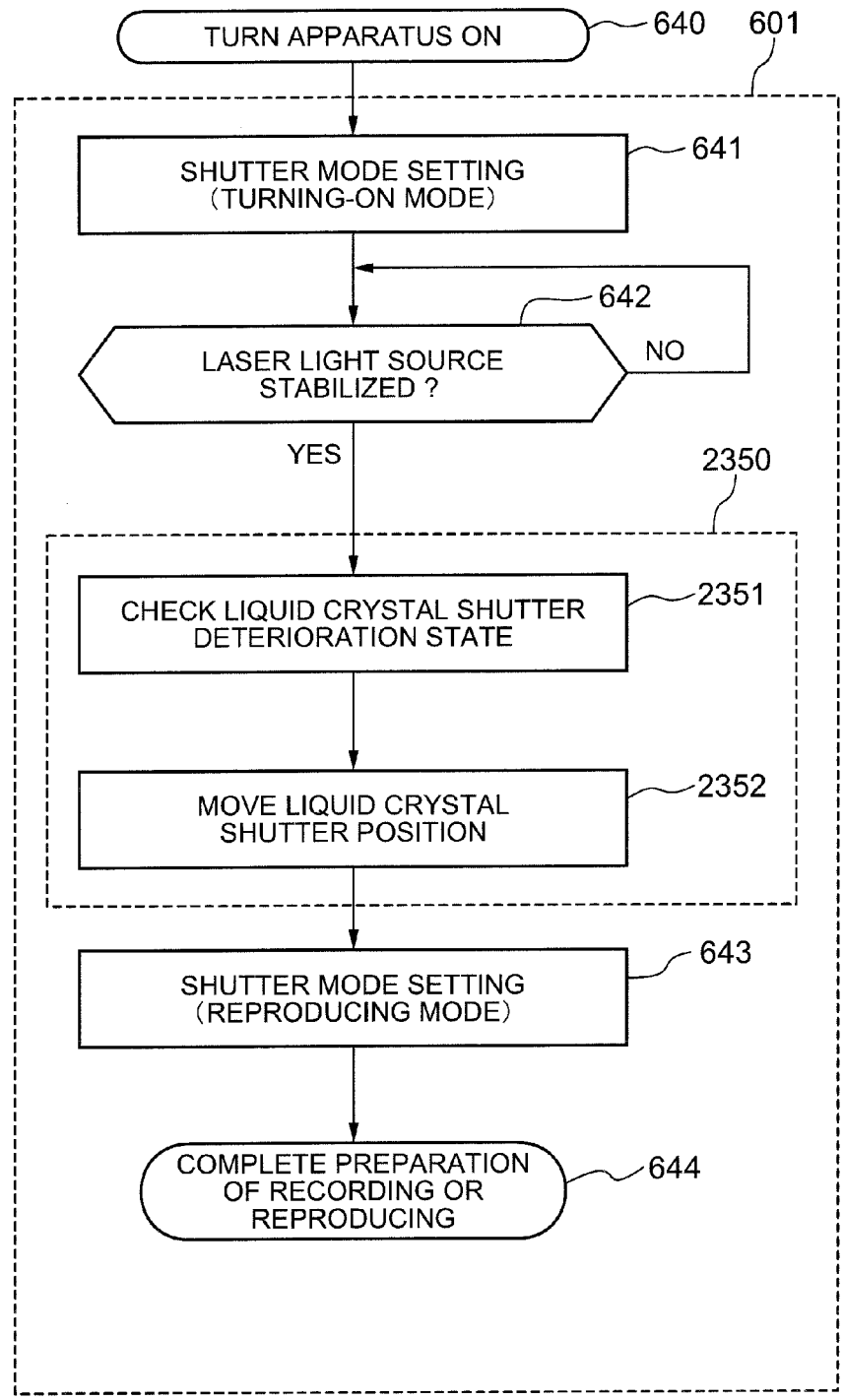
FIG. 10D is a diagram of an embodiment of the operation flow in the optical information recording/reproducing apparatus.

FIG. 10A shows an operation flow from inserting the disc 50 being an optical information recording medium into the optical information recording/reproducing apparatus 300 to completing the preparation of recording or reproducing, and FIG. 10B is an operation flow from the preparation completed state to recording information on the optical information recording medium 1, and FIG. 10C is an operation flow from the preparation completed state to reproducing the information recorded on the disc 50. In addition, FIG. 10D shows a detailed flow of a shutter mode setting section 601 shown in FIG. 10A.

As shown in FIG. 10A, when the disc 50 is inserted to start the processing of the optical information recording/reproducing apparatus 300 (600), the shutter 30 selects the states shown in FIG. 8 to cause the apparatus to be brought into a disc signal reading mode, that is, reproducing mode, so as to first determine the type of the disc 50 (601), and the optical information recording/reproducing apparatus 300 performs disc determination of, for example, whether or not the inserted disc-like medium is a medium with which digital information is recorded or reproduced using holography (602).

If the disc is determined to support recording or reproducing digital information using holography, as a result of the disc determination, the optical information recording/reproducing apparatus 300 reads out control data provided in the disc 50 (603), and information on the disc 50 or the like and information on various setting conditions or the like for the time of recording or reproducing are obtained.

After reading out the control data, various adjustments corresponding to control data and a learning process relating to the optical pickup 200 are performed (604), and furthermore the learning process is continued in a reproducing mode and/or a recording mode while the liquid crystal shutter 4a of the shutter 30 determines the shutter operation pattern for the time of reproducing shown in FIG. 9 (605). When the learning process (604) is terminated, the optical information recording/reproducing apparatus 300 completes the preparation of recording or reproducing (606).

The operation flow from the preparation completed state to recording information includes, as shown in FIG. 10B, bringing setting of the shutter 30 into the recording mode shown in FIG. 8 (611), receiving data to be recorded (612), and transmitting information corresponding to the data to the spatial light modulator (SLM) 15 in the optical pickup 200.

Various learning processes for recording are performed in advance, as necessary, which optimize, for example, the power of the laser light source 1 and optimizes an exposure time by the shutter 30, so as to record high-quality information on the optical information recording medium (613).

Thereafter, in a seek operation (614), the disc 50 is positioned at a predetermined position with respect to the positions of the optical pickup 200 and the cure system 70, by controlling the access controlling circuit 381. The typical setting for the shutter mode in a seek operation is generally similar to that for reproducing mode. If the disc 50 contains address information (TOC (Table Of Contents) of a CD or a D)), the address information is reproduced to confirm whether or not the disc is positioned at a target position, and if the disc is not positioned at the target position, an operation of calculating the amount of deviation from the predetermined position to perform the positioning again is repeated.

On the other hand, the shutter may be in the ON state during a period (in rough adjustment) from reading TOC information, which is contained in the disc 50, on the disc at the beginning of the seek operation, to bringing the disc 50 closer to the predetermined position with respect to the positions of the optical pickup 200 and the cure system 70.

Thereafter, to perform pre-curing to a predetermined region using the light beam 70a emitted from the cure system 70 (616), the shutter 30 sets the shutter mode to a curing mode shown in FIG. 7 beforehand (615). After performing the pre-curing (616), the shutter 30 sets the shutter mode to the recording mode shown in FIG. 8 (617). The signal beam 101 and the reference beam 111 emitted from the optical pickup 200 are then used for recording the data (618).

After recording the data, the shutter mode is set to the curing mode shown in FIG. 7 again (619), and the light beam 70a emitted from the cure system 70 is used for post-curing (620). The data may be here verified as necessary.

An operation flow from the preparation completed state to reproducing the recorded information is, as shown in FIG. 10C, to first set the shutter mode (631) for the seek operation (632). Here, the shutter mode for the seek operation (632) is typically similar to the reproducing mode shown in FIG. 8. In the seek operation (632), the access controlling circuit 381 is controlled to position the disc 50 at a predetermined position in the reproducing reference beam optical system including the optical pickup 200 and the optical systems 21 and 24. If the disc 50 contains the address information, the address information is reproduced to confirm whether or not the disc is positioned at the target position, and if the disc is not positioned at the target position, the operation of calculating the amount of deviation from the predetermined position and performing the positioning again is repeated.

Thereafter, the reference beam emitted from the optical pickup 11 to read out information recorded in the optical information recording medium (633), and reproduced data is sent (634).

An operation flow after turning on the optical information recording/reproducing apparatus 300 until starting recording or reproducing will be next described with reference to FIG. 10D.

In FIG. 10D, after the apparatus is turned on (640), the shutter part 30 sets the shutter mode to a turning-on mode shown in FIG. 7 (641). In the optical information recording/reproducing apparatus according to the present embodiment, when the light beam is emitted from the laser light source upon turning on the apparatus, a wavelength and a power of the light beam are monitored by, for example, a light monitor (not shown) in the laser light source portion. Subsequently, after stabilization of the wavelength and the power needed to recording and reproducing (Yes in step 642), the deterioration state of the liquid crystal shutter is monitored by the sensor 122, or the deterioration state of the liquid crystal shutter due to the damage by the irradiation of the light beam is checked by a timer (not shown) for measuring the time for which the light beam is applied to a single surface on the liquid crystal shutter (2351), the position of the liquid crystal shutter is moved (shifted) when it is determined that desired ON/OFF performance of the shutter cannot be satisfied because the deterioration of the liquid crystal shutter proceeds (2352), and a shuttering operation is performed using an available region on the liquid crystal surface. Here, the setting of the shutter mode is transferred to the reproducing mode shown in FIG. 7 for the first time. This is because the irradiation of the light beam to the disc 50 in an unstable state of the power and the wavelength thereof does not allow the signal information to be accurately exchanged.

Note that the stability of the wavelength and the power may be considered that, for example, the wavelength and the power of the laser are within the ranges of predetermined errors. Alternately, a configuration may be employed for determining the wavelength and the power to be stabilized when a predetermined period of time has lapsed from turning on the apparatus or the laser light source is turned on, rather than for monitoring the wavelength and the power of the light beam.

In addition, with such a flow configuration of FIG. 10D, in apparatuses that require a lot of time until the stabilization of the wavelength and the power of the laser, the life of the liquid crystal element can be extended because the light beam will not be applied to a new portion on the liquid crystal shutter at an unnecessary point in time.

Furthermore, as shown in the same FIG. 10D, a determination section of whether or not to move the liquid crystal shutter 4a is provided (2350), where a flow (2352) of determining whether or not to move the liquid crystal shutter 4a based on the deterioration state of the liquid crystal shutter 4a (2351) is added. In addition, the determination section (2350) is the same as the determination section shown in FIG. 11 to be described hereafter, and shown in FIG. 17A, FIG. 17B, and FIG. 17C to be described hereafter.

A shuttering operation during the movement between the pages of holograms will be next described. In the optical information recording/reproducing apparatus using hologram, for example, reference beam angle data is obtained by calculating one or more reference beam angles corresponding to the pages in advance, or is held in a table in a form of data. The reference beam angle data and the table are provided in, for example, the controller 389, the servo signal generating circuit 383, or the servo controlling circuit 384. In the present embodiment, specially, at the time of recording data, the shutter brings the mechanical shutter into a retracted state, and drives only ON/OFF of the liquid crystal shutter. In this case, the liquid crystal shutter becomes OFF after fixing the angle of the galvanometer mirror 23 shown in FIG. 1 at a certain reference beam angle, and the signal beam 101 and the reference beam 111 are applied to the disc 50 to interfere with each other, forming one page of hologram. Consequently, at the time of forming the next page of hologram, after the liquid crystal shutter becomes ON, that is, the light beam is shielded, the angle of the galvanometer mirror 23 is changed to the next angle position, and when the galvanometer mirror 23 is fixed at the angle, the liquid crystal shutter becomes OFF again, that is, the signal beam 101 and the reference beam 111 are applied to the disc 50, continuously forming the next page of hologram. This operation is repeated to form a plurality of preset pages of hologram.

Figure 11:
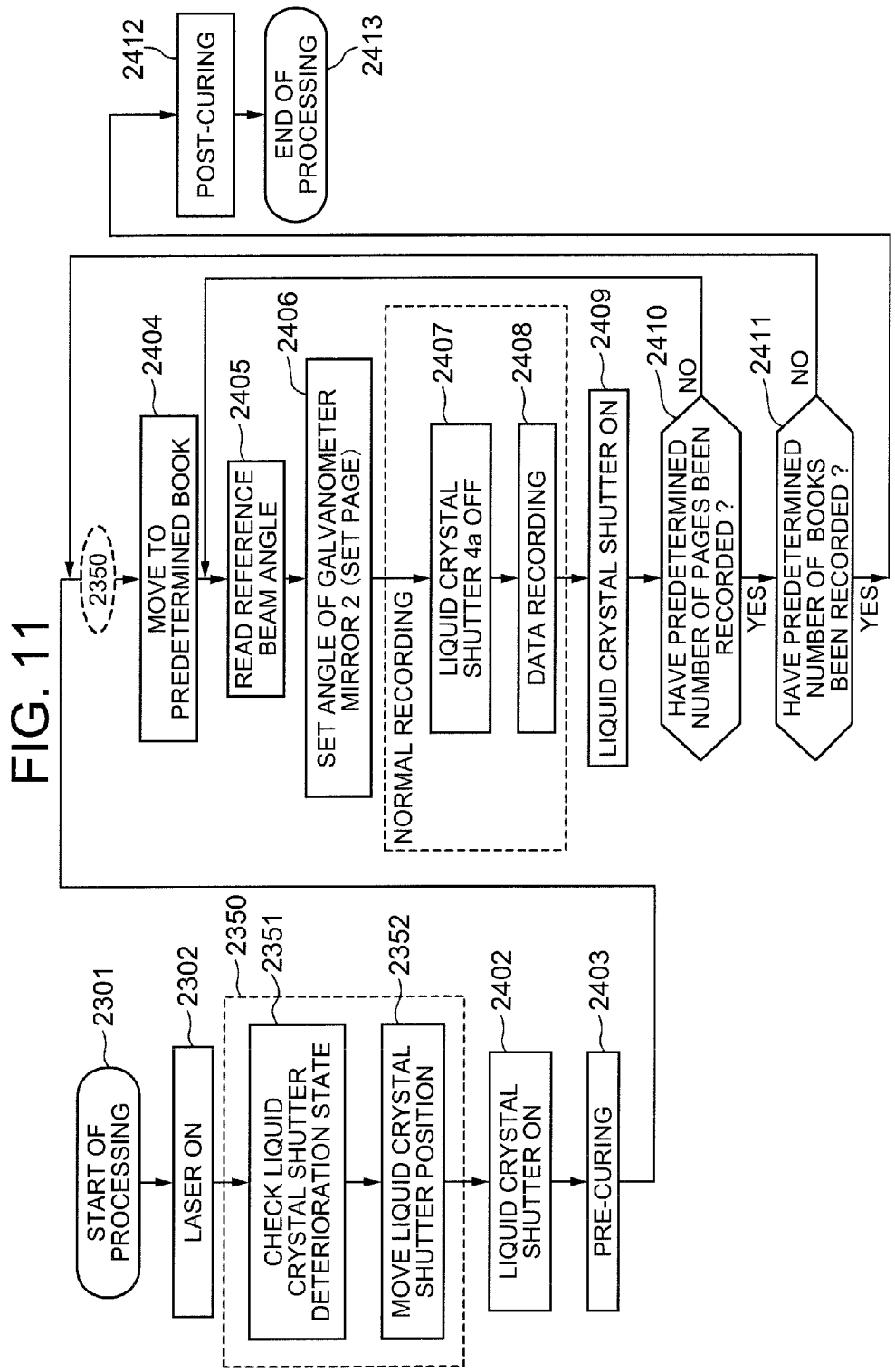
FIG. 11 is a diagram of an embodiment of an operation flow in the optical information recording/reproducing apparatus.
Figure 17A:
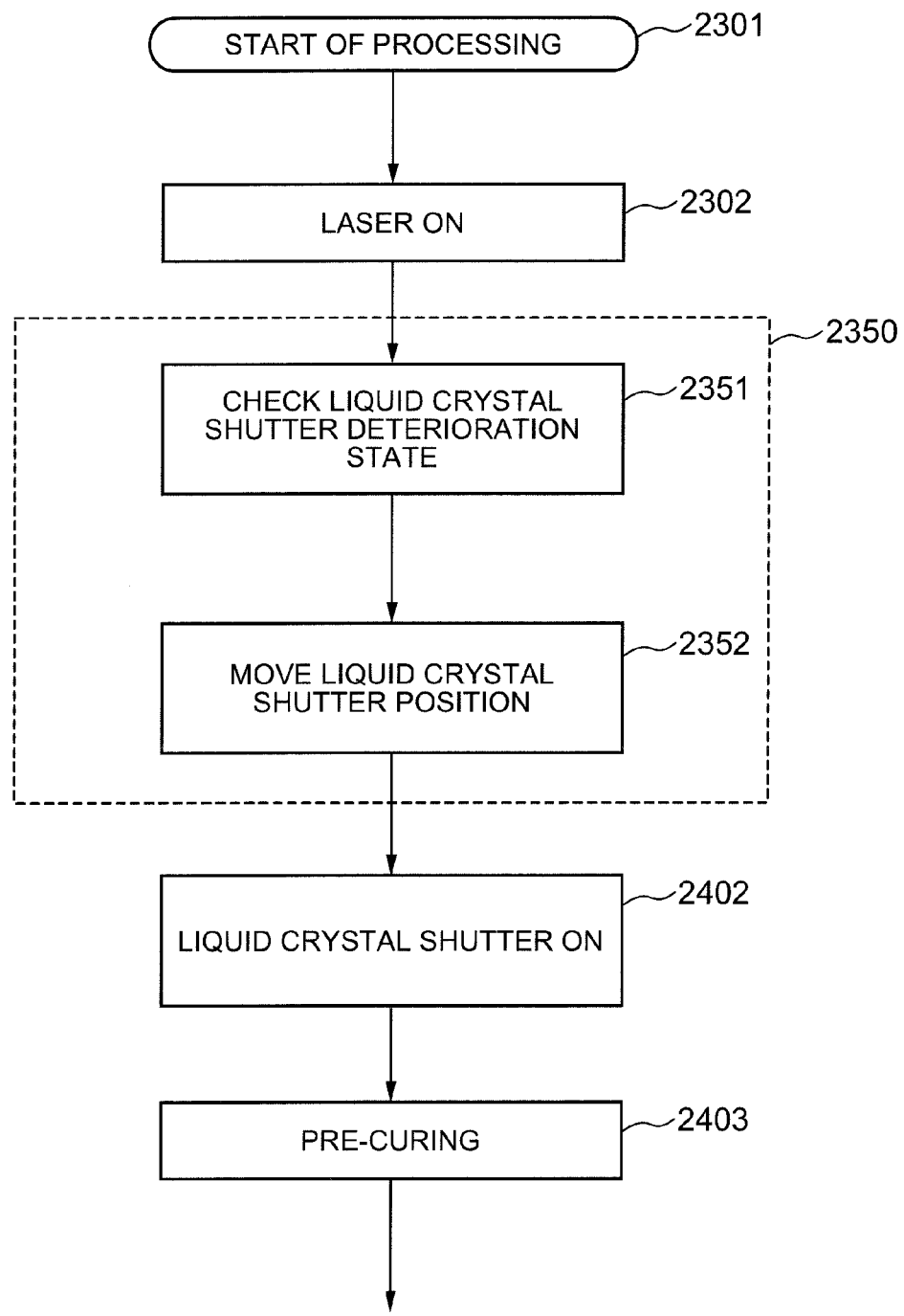
FIG. 17A is a diagram showing an embodiment of an operation flow in the optical information recording/reproducing apparatus.

Consequently, one example of a flow at the time of recording will be shown in FIG. 11. When the processing is started (2301), the laser is brought into the ON state (2302) to stabilize the laser light. Here, the stabilized light beam 100 passes through the liquid crystal shutter 4a, and a portion thereof enters the sensor 122 of FIG. 1. The deterioration state of the liquid crystal shutter is thereby checked (2351), and the position of the liquid crystal shutter is moved if it is determined that the liquid crystal shutter is damaged based on the result (2352). This section will be described in detail with reference to FIGS. 17A to 17C. FIG. 17A is an extracted diagram of both prior to and subsequent to the determination section (2350) of the flow at the time of recording shown in FIG. 11, and FIG. 17B and FIG. 17C are diagrams illustrating the determination section (2350) in detail.

Figure 17B:
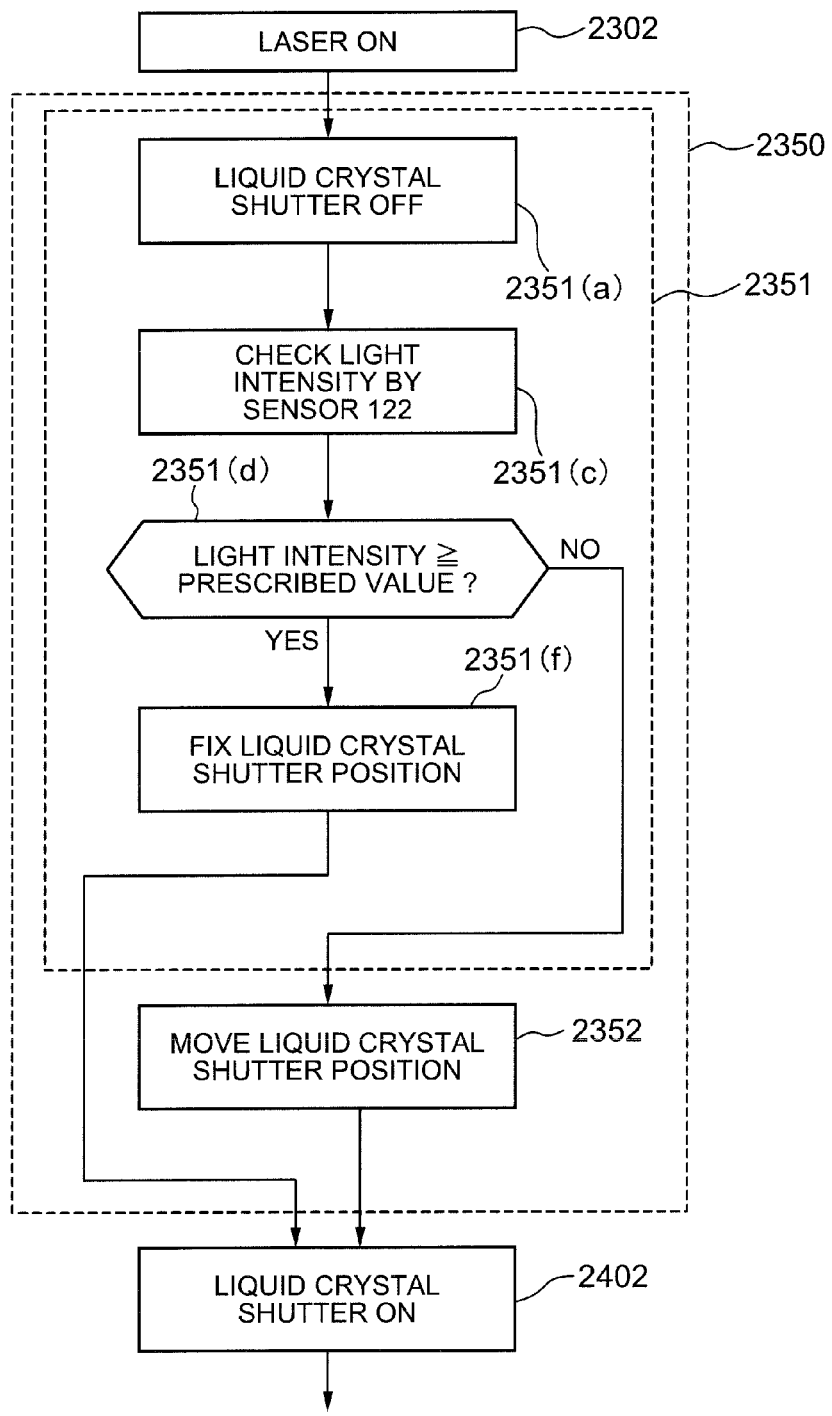
FIG. 17B is a diagram showing an embodiment of the operation flow in the optical information recording/reproducing apparatus.

In FIG. 17B, when the liquid crystal shutter 4a is brought into the OFF state, that is, the light beam of the laser is brought into a transmission state after the laser is brought into the ON state (2302), the light intensity is checked by the sensor 122 positioned downstream of the liquid crystal shutter (2351(c)). It is next determined whether or not the light intensity is equal to or more than the prescribed value based on the result of checking the light intensity (2351(d)), and if the light intensity is equal to or more than the prescribed value, the liquid crystal shutter is determined not to deteriorate (Yes at step 2351(d)), the position of the liquid crystal shutter remains as it is (2351(f)), and the processing proceeds to the next step of liquid crystal shutter ON (2402). If the light intensity is then equal to or less than the prescribed value, the liquid crystal shutter is determined to deteriorate (No at step 2351(d)), the position of the liquid crystal shutter is moved (2352), and the processing proceeds to the next step of liquid crystal shutter ON (2402).

Figure 17C:
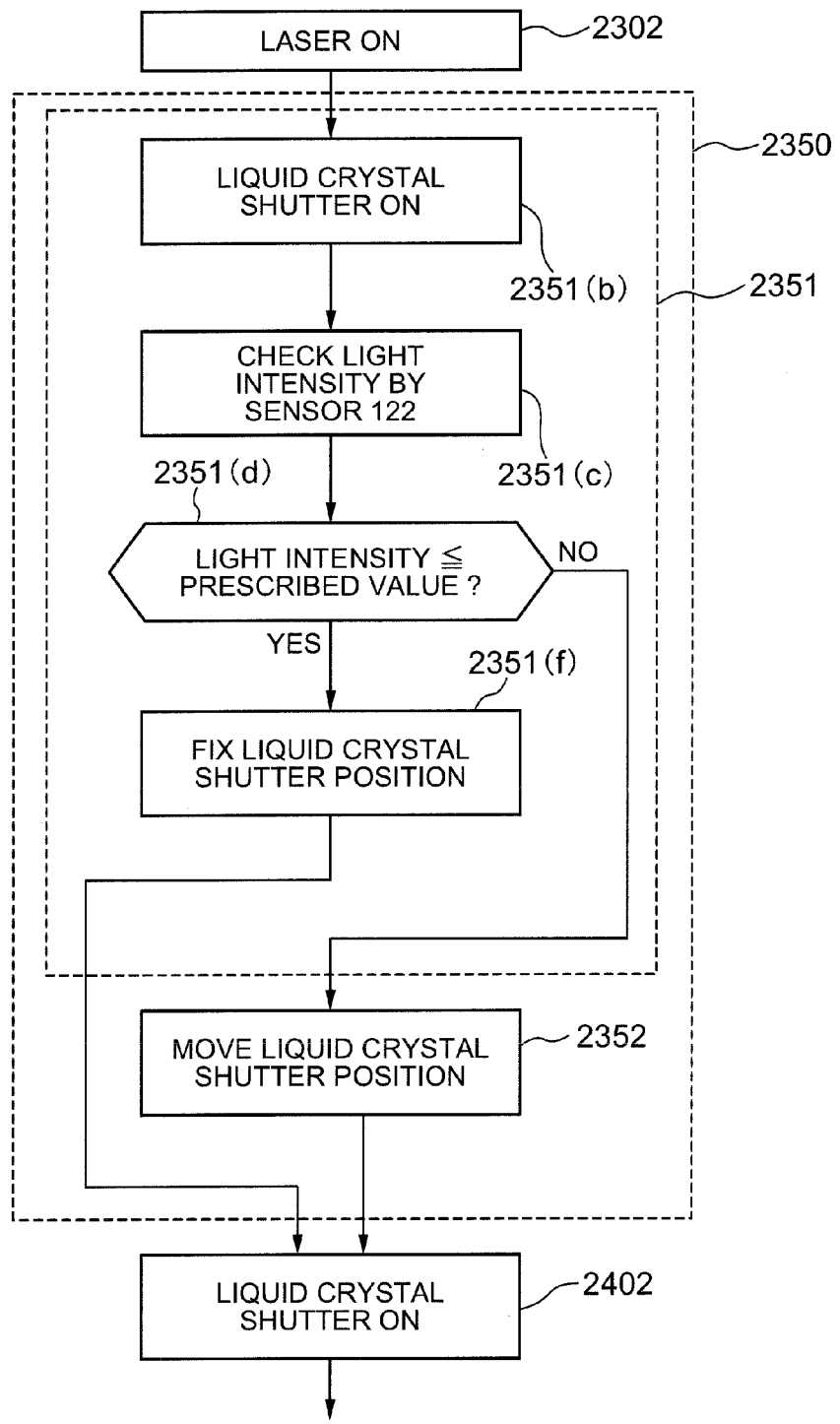
FIG. 17C is a diagram showing an embodiment of the operation flow in the optical information recording/reproducing apparatus.

On the other hand, in FIG. 17C, when the liquid crystal shutter 4a is brought into the ON state, that is, the light beam of the laser is brought into a shielded state after the laser is brought into the ON state (2302), the light intensity is checked by the sensor 122 positioned downstream of the liquid crystal shutter (2351(c)). It is next determined whether or not the light intensity is equal to less than the prescribed value based on the result of checking the light intensity (2351 (d)), and if the light intensity is equal to or less than the prescribed value, the liquid crystal shutter is determined not to deteriorate (Yes at step 2351(d)), the position of the liquid crystal shutter remains as it is (23510), and the processing proceeds to the next step of liquid crystal shutter ON (2402). If the light intensity is then equal to or more than the prescribed value, the liquid crystal shutter is determined to deteriorate (No at step 2351(d)), the position of the liquid crystal shutter is moved (2352), and the processing proceeds to the next step of liquid crystal shutter ON (2402).

Here, in the optical information recording/reproducing apparatus of the present invention, the flow shown in FIG. 17B may be applied, or the flow shown in FIG. 17C may be applied. Alternately, the combination of both of the flows may be applied so as to move the liquid crystal shutter if the light intensity is out of a predetermined range.

Figure 18:
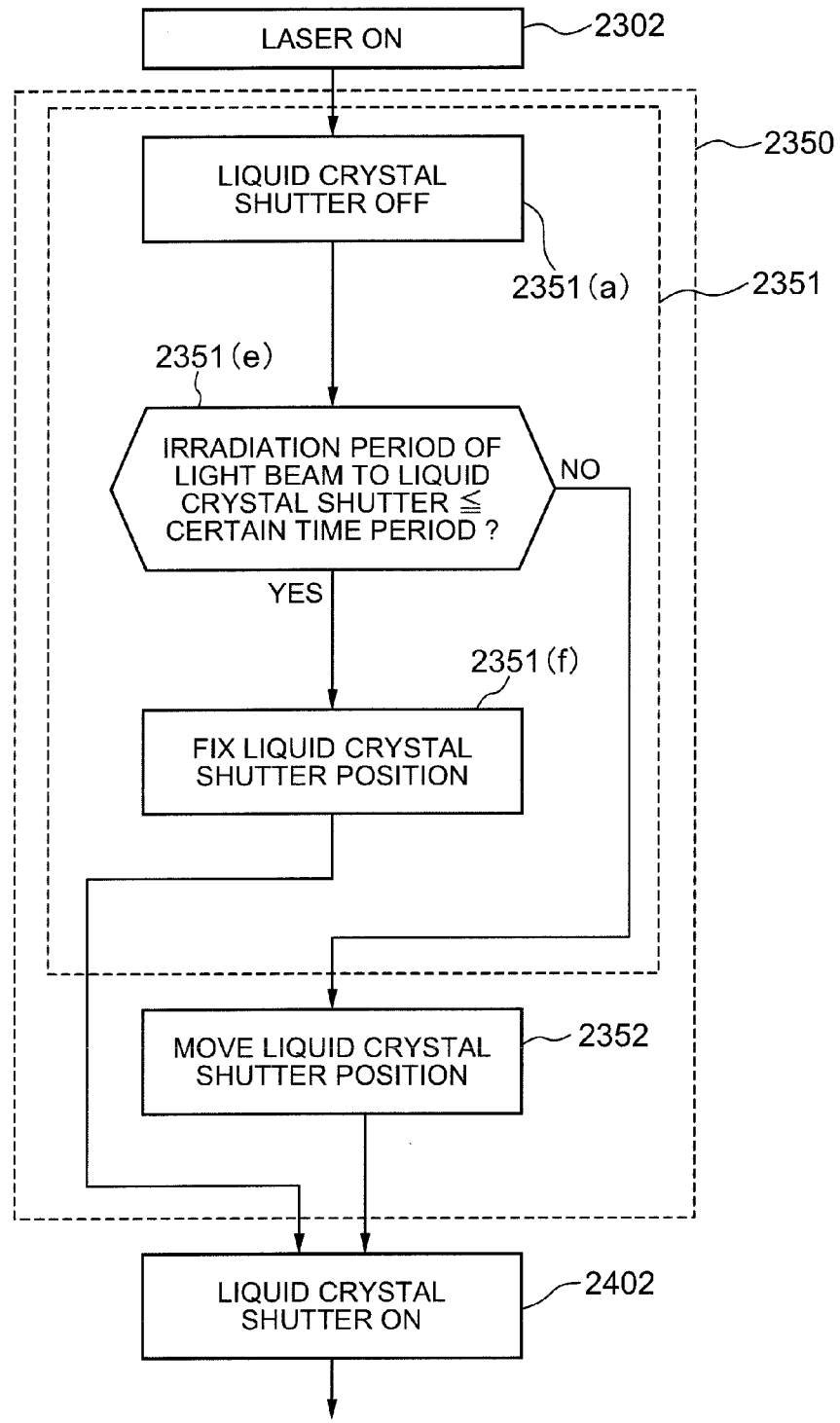
FIG. 18 is a diagram showing an embodiment of the operation flow in the optical information recording/reproducing apparatus.

In addition, as shown in FIG. 18, a method may be employed in which it is determined whether or not the light beam is applied to the liquid crystal shutter for a predetermined period of time or more by a timer or clocking means having a countering function (2351(e)), and the liquid crystal shutter is moved if the liquid crystal shutter is determined to deteriorate (2352).

Subsequently, as shown in FIG. 11, the liquid crystal shutter 4a is brought into the ON state (2402) to perform pre-curing (2403). Next, the position of the motor 60 for rotating the optical information recording medium 50 is moved (2404) such that the signal beam 101 and the reference beam 111 are applied to a target book position in the optical information recording medium at which data is recorded. Note that the target position is a region where the pre-curing is performed in step 2403.

Next, angle data for controlling the galvanometer mirror 22 is read to control the reference beam angle, in order to record page data on the optical information recording medium 50 (2405). Then, the angle setting of the galvanometer mirror 22, that is, page setting is performed (2406). For example, an angle at which the reference beam enters the disc is set at a first angle.

Subsequently, the liquid crystal shutter 4a is brought into the OFF state (2407), to transmit the light beam, forming data in the optical information recording medium (2408). When recording one page data is terminated, the liquid crystal shutter is brought into the ON state, that is, transferred to the shielding state (2409), and it is determined whether or not to perform the next page recording (2410). Here, an incident angle of the reference beam corresponding to the next page is set at a second reference beam angle different from the first angle. Then, the recorded book is checked (2411), and a post-curing process is performed (2412). Then, the processing is terminated (2413).

Here, if it is determined that the recording of the number of predetermined books has not been terminated yet as a result of checking the recorded book (2411), the processing is returned to step (2404) of moving to the predetermined book. In addition, here, checking the deterioration state of the liquid crystal shutter (2351) and moving the liquid crystal shutter (2352) are integrated into step (2350), and the processes of checking the deterioration state of the liquid crystal shutter and moving the liquid crystal shutter (2350) may be performed before step (2404) of moving to the predetermined book (step (2350) surrounded by a thick dotted line).

As described above, according to the present embodiment, since a region to which the laser is not applied (available region) is used in the region of the liquid crystal shutter, the performance as the liquid crystal shutting function is made stable, and the life of the shutter part 30 being the liquid crystal shutter unit can be made longer. In addition, the shutter uses the liquid crystal element rather than a mechanical shutter having inertia, allowing for supporting high-speed information recording.

Here, with respect to the liquid crystal element used for the liquid crystal shutter, surroundings of the liquid crystal element are adhered with a sealant or an adhesive to seal the liquid crystal. Some sealant or adhesive seep into a liquid crystal portion as impurities, which may affect the liquid crystal element, that is, may cause the characteristics of the liquid crystal element to deteriorate. For these reasons, when the liquid crystal element is used, and thus the liquid crystal shutter is used, the best characteristics of the liquid crystal element can be obtained around the center portion thereof. Thus, in the first embodiment, as shown in FIGS. 3A and 3B, there has been described the method in which the light beam 100 is applied first to the edge portion (STEP1) of the liquid crystal shutter 4a, but the present invention is not limited thereto, and the irradiation may be started from the position of the center portion having good characteristics (STEP2) as the liquid crystal element. In addition, here, detection methods of the substantially center portion of the liquid crystal element may include a method of, in the optical information recording/reproducing apparatus of the present invention, registering the center position of the liquid crystal element by a user in advance, or for example, moving the liquid crystal shutter while the light beam is applied to both edge portions or four edge portions of the liquid crystal element, and using the sensor 122 and storing positions at which the light intensity detected by the sensor 122 becomes almost zero, so as to automatically detect the center portion of the liquid crystal element by considering the middle position of the stored positions as the substantially center portion of the liquid crystal element.

From the viewpoint described above, in the present embodiment, the edge portion (STEP1) of the liquid crystal shutter 4a is a position at which the light beam 100 is first applied to the liquid crystal shutter 4a, but the present invention is not limited thereto, and the optical information recording/reproducing apparatus may be configured to set the position of the first irradiation to a position in which composition of the liquid crystal element is more stable as a liquid crystal element surface (panel), than those of the other positions, for example, to the position of STEP2, so as to have a shutting function that is most stable at the beginning of use.

In addition, in the embodiment 1, there is described the method of moving the liquid crystal shutter 4a in the X direction, with three STEPs, the present invention is not limited thereto, the liquid crystal shutter 4a may be shifted by the almost same amount as a diameter of the light beam, or for example, by the amount that is about 120% of the diameter of the light beam in expectation of the influence of the damage spreading over the surroundings of a region on the liquid crystal element to which the light beam is applied; and the number of STEPs is not limited to three.

Embodiment 2

A second embodiment will be next described with reference to FIGS. 12A to 12D and FIGS. 13A and 13B. FIGS. 12A to 12D are diagrams each illustrating the moving direction of the liquid crystal shutter as described above in an expanding manner in two dimensions in the X direction and the Z direction. Here, the liquid crystal shutter 4a is brought into the OFF state in each diagram, or the state of transmitting the light beam 100. In addition, in the first embodiment, the movement of the liquid crystal shutter is limited to linear motion, but the investigation for the present invention includes not only the moving direction of the liquid crystal shutter in a one-dimensional linear motion (X direction), but also the moving directions expanded in a perpendicular direction (Z direction).

Figure 12A:
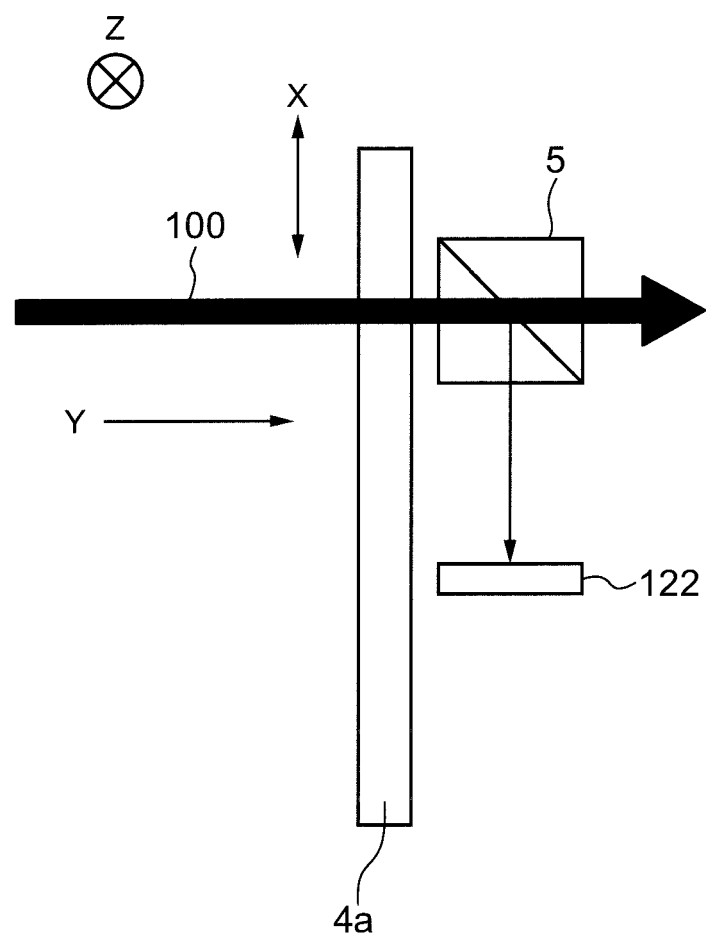
FIG. 12A is a schematic view illustrating a second embodiment of an optical pickup in the optical information recording/reproducing apparatus according to the present invention.
Figure 12B:
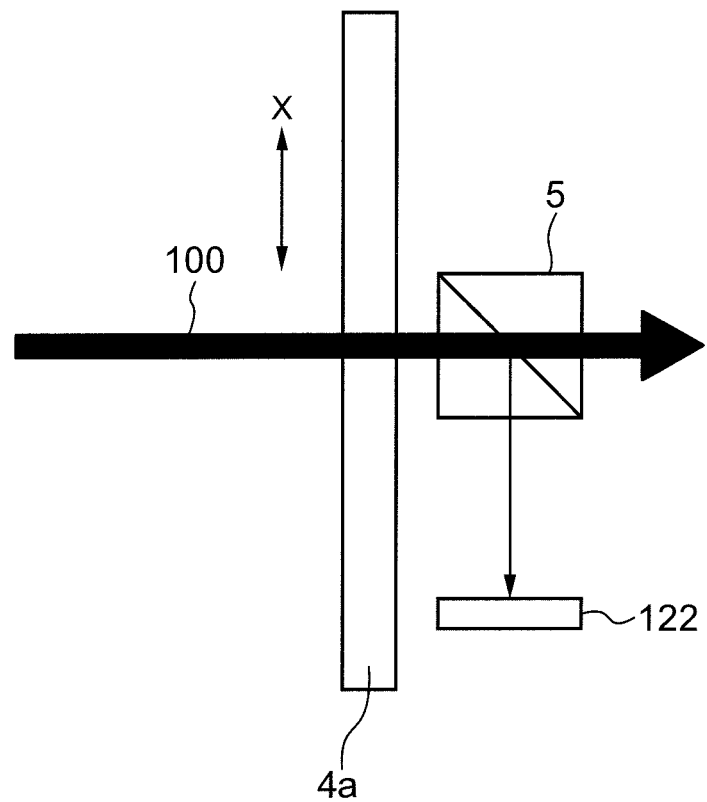
FIG. 12B is a schematic view illustrating the second embodiment of the optical pickup in the optical information recording/reproducing apparatus according to the present invention.
Figure 12C:
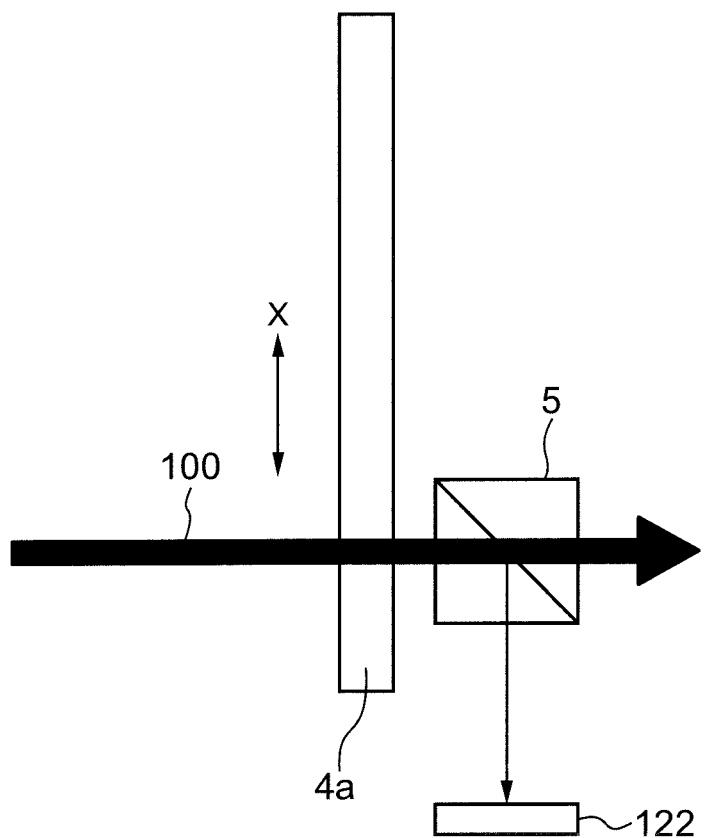
FIG. 12C is a schematic view illustrating the second embodiment of the optical pickup in the optical information recording/reproducing apparatus according to the present invention.
Figure 12D:
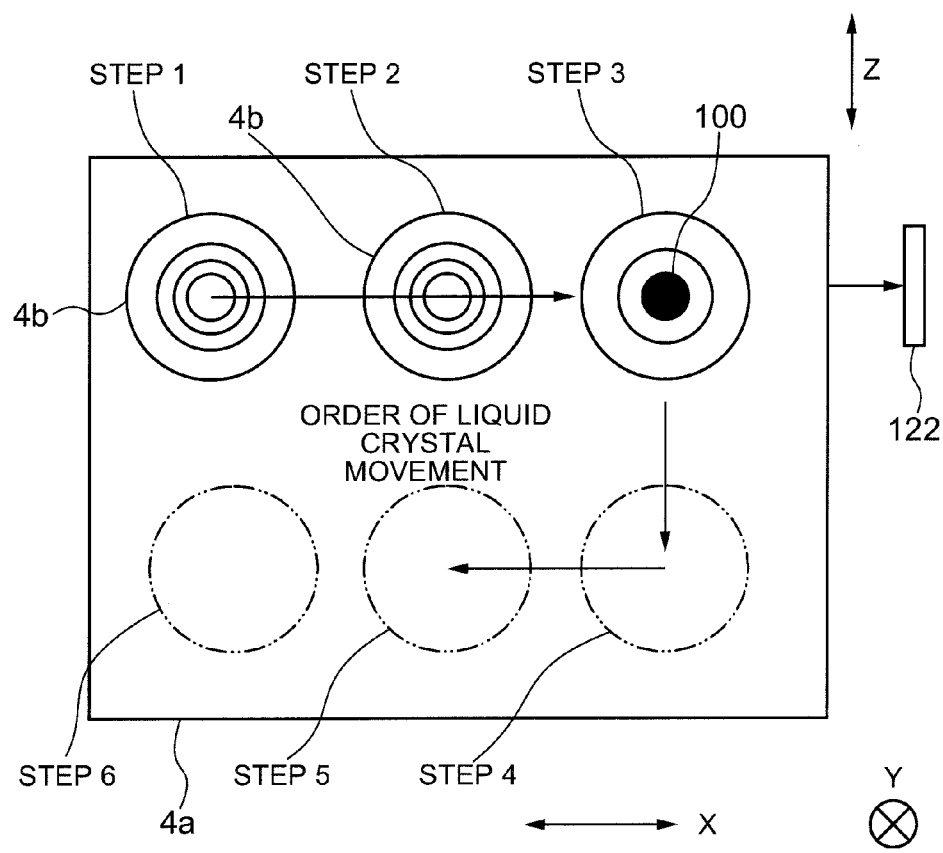
FIG. 12D is a schematic view illustrating the second embodiment of the optical pickup in the optical information recording/reproducing apparatus according to the present invention.

Here, FIGS. 12A, 12B, and 12C are diagrams viewed in a direction perpendicular to the plane of paper of FIG. 1, that is, in a Z-axis direction, and FIG. 12D is a diagram viewed in a traveling direction of the light beam, that is, in the Y direction.

Because of the deterioration of the liquid crystal element, the liquid crystal shutter 4a is moved from a position of FIG. 12A being the first position of the light beam to a position of FIG. 12B, by an actuator (not shown), and the deterioration proceeds also at the position of FIG. 12B so as to be determined to be insufficient for the liquid crystal shutting function, and the position of the light beam 100 is now moved to a position of FIG. 12C, that is, a position of STEP3 of FIG. 12D. Subsequently, if the liquid crystal shutter 4a is damaged by the light beam 100 at the position of STEP3, the liquid crystal shutter 4a is moved to a position of STEP4, by an actuator (not shown) for moving the liquid crystal shutter 4a in the Z direction.

Figure 13A:
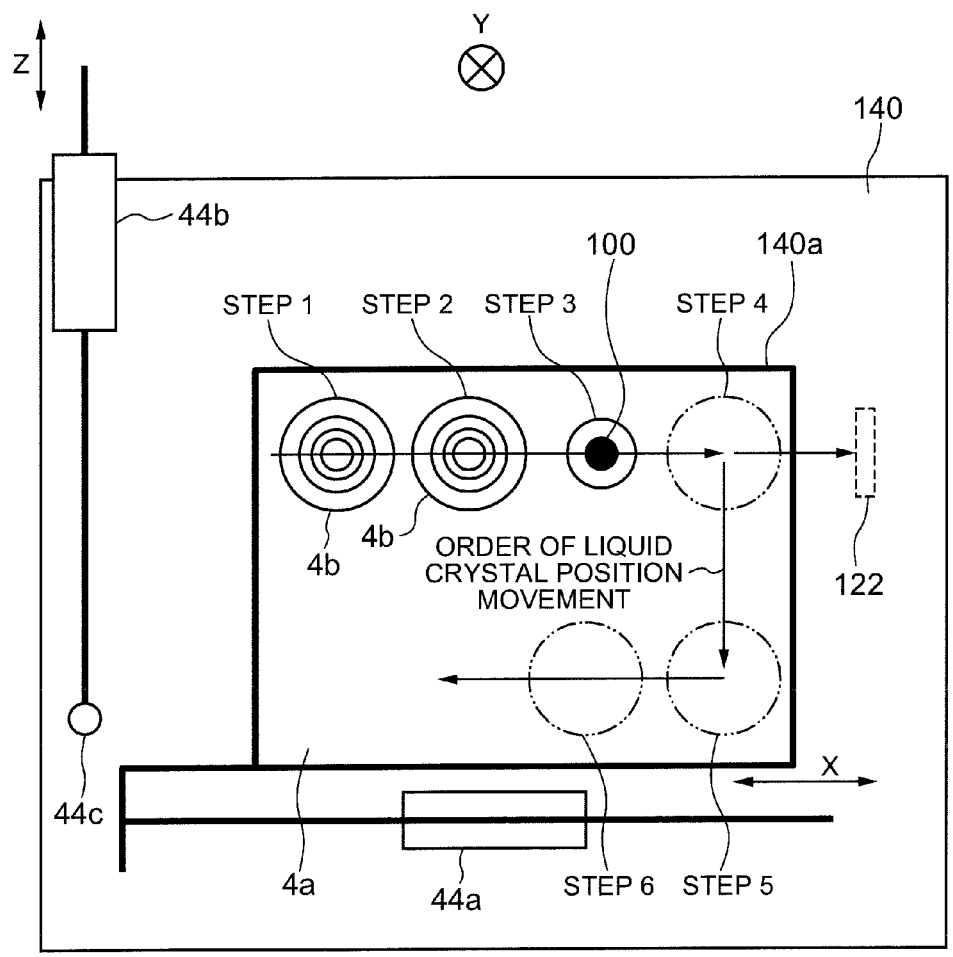
FIG. 13A is a schematic view illustrating the second embodiment of the optical pickup in the optical information recording/reproducing apparatus according to the present invention.
Figure 13B:
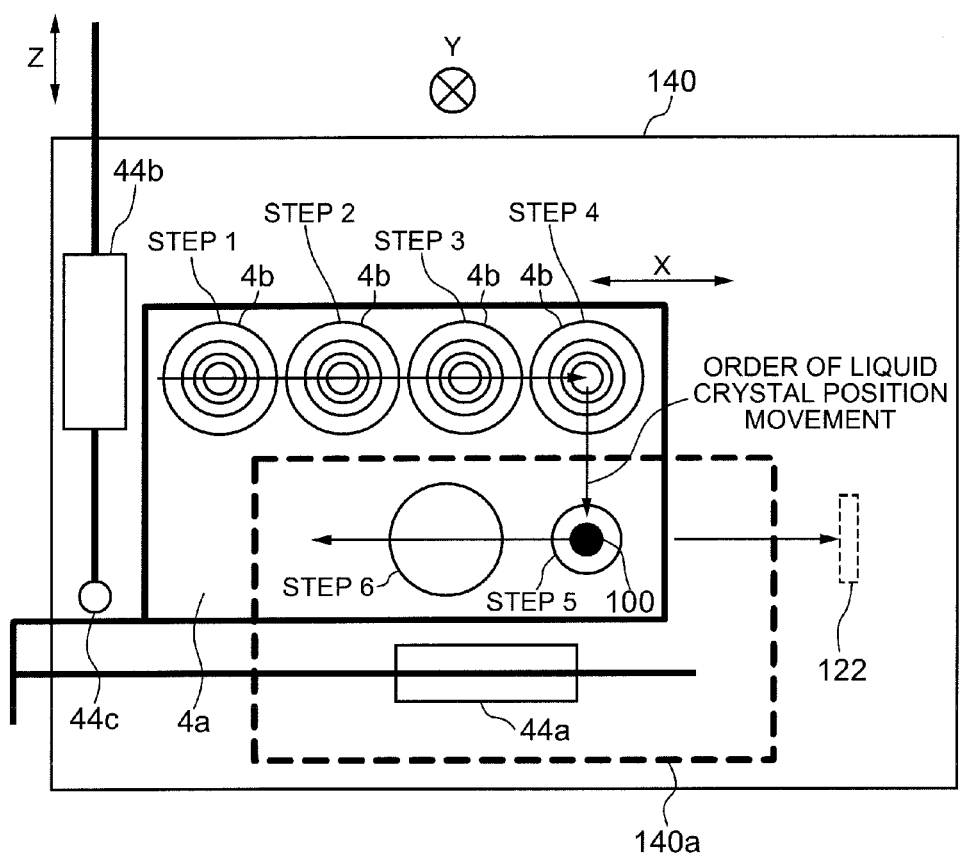
FIG. 13B is a schematic view illustrating the second embodiment of the optical pickup in the optical information recording/reproducing apparatus according to the present invention.

Actuators 44a and 44b for two-dimensionally moving the liquid crystal shutter 4a will be next described with reference to FIG. 13A and FIG. 13B.

In these drawings, reference numeral 4a denotes the liquid crystal shutter, reference character 44a denotes an actuator for moving the liquid crystal shutter in the X direction, reference numeral 140 denotes a base for fixing the actuator 44, and reference character 44b denotes an actuator for moving the liquid crystal shutter in the Z direction. A tip 44c of the actuator 44b is fixed to the base 140. Here, reference character 140a denotes a position of an outermost shape of the liquid crystal shutter 4a at the position of FIG. 12A, and in FIG. 13B, the position corresponding to that of FIG. 13A is illustrated by a dotted line 140a.

In addition, FIGS. 12A to 12D show one example in which the light beam stays at four spots or more in one line in the X direction (FIG. 11 shows an example of three spots). Here, the actuator 44a is an actuator for moving the liquid crystal shutter 4a in a lateral direction with respect to the plane of paper, that is, in the X direction, and the actuator 44b is also an actuator for moving the liquid crystal shutter 4a in a vertical direction with respect to the plane of paper, that is, in the Z direction. The positions of the actuators 44a and 44b are controlled by the shutter controlling circuit 387 in the apparatus based on the degree of damage to the liquid crystal shutter, that is, the deterioration state, and FIG. 13A shows that the light beam 100 is at the position of STEP3 and FIG. 13B shows that the light beam 100 is at the position of STEP5.

In addition, also in the present embodiment, the position at which the light beam 100 is first applied to the liquid crystal shutter 4a is set at the edge portion (STEP1) on the liquid crystal shutter 4a, but the present invention is not limited thereto, and the position at which the composition is more stable as the liquid crystal element, for example, STEP2, STEP3, STEP5, STEP6, or the substantially center position of the liquid crystal element (a substantially center position between STEP2 and STEP6) may be the position of the first irradiation.

Embodiment 3

Figure 14:
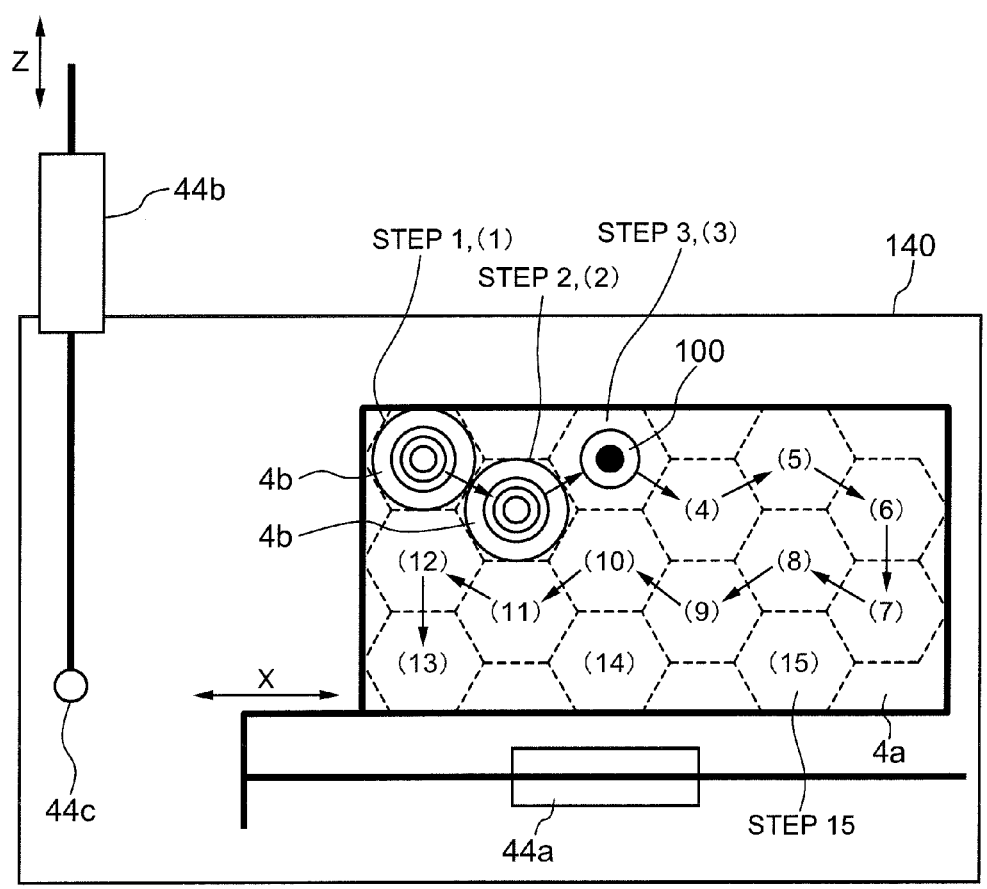
FIG. 14 is a schematic view illustrating a third embodiment of an optical pickup in the optical information recording/reproducing apparatus according to the present invention.

As described above, in the embodiment 2, there is described the example in which the liquid crystal shutter is two-dimensionally moved in the X direction (STEP1 to STEP4), in the Z direction (STEP4 to STEP5), and in the X direction (after STEP5), FIG. 14 shows another example of a method of how to move the liquid crystal shutter so as to be efficiently moved in the region on the surface of the liquid crystal shutter 4a. The reference characters in the drawing are the same as those used for the above description, and will be omitted here. Since the light beam 100 is applied to the liquid crystal shutter 4a as a substantially circular beam, the region on the surface of the liquid crystal is divided into the areas substantially regular hexagons, and the movement along the regions of the substantially regular hexagons allows for using more of the surface of the liquid crystal to which the light beam has not been applied yet, as a shutter, while avoiding areal uselessness of the region. The light beam is moved according to the deterioration state of the liquid crystal shutter so as to be moved to positions (1), (2), . . . , (15) on the liquid crystal shutter 4a in FIG. 14. In FIG. 14 shows that the position (1), i.e., STEP1, and the position (2), i.e., STEP2 are positions having been damaged by the light beam and the liquid crystal elements thereof have deteriorated, and that the position of the light beam is at the position (3), i.e., STEP3.

From the above description, if one region on the liquid crystal shutter 4a deteriorates, the remaining region (available region) which has not been irradiated with the light beam yet is used, which can achieve the enhancement of longevity of the shutter part 30 as the liquid crystal shutter unit.

In addition, in the embodiment 3, as with the embodiment 1 and the embodiment 2, the position at which the light beam 100 is first applied to the liquid crystal shutter 4a is set to the edge portion (STEP1) on the liquid crystal shutter 4a, but the present invention is not limited thereto, and as described in the embodiment 1 and the embodiment 2, the position at which the composition is more stable as the liquid crystal element, for example, the vicinity of the position (10) being the substantially center position may be the position of the first irradiation of the light beam.

In addition, in the first to third embodiments described above, there has been described the examples in which the liquid crystal portions having deteriorated by the light beam are not reused, but the present invention is not limited thereto. If the state of the surface of the liquid crystal element can be recovered by any method of refreshing the once-deteriorated surface (bringing it into an available state) over time, or refreshing the liquid crystal element itself, the deterioration state or the recovered state is detected by the sensor 122, and the surfaces may be reused in a circulating manner unless a single region to which the light beam is applied is continuously used.

Embodiment 4

FIGS. 15A, 15B and FIGS. 16A, 16B show an example of using an arc-shaped liquid crystal shutter, rather than the substantially rectangular liquid crystal shutter described in the first to third embodiments.

Figure 15A:
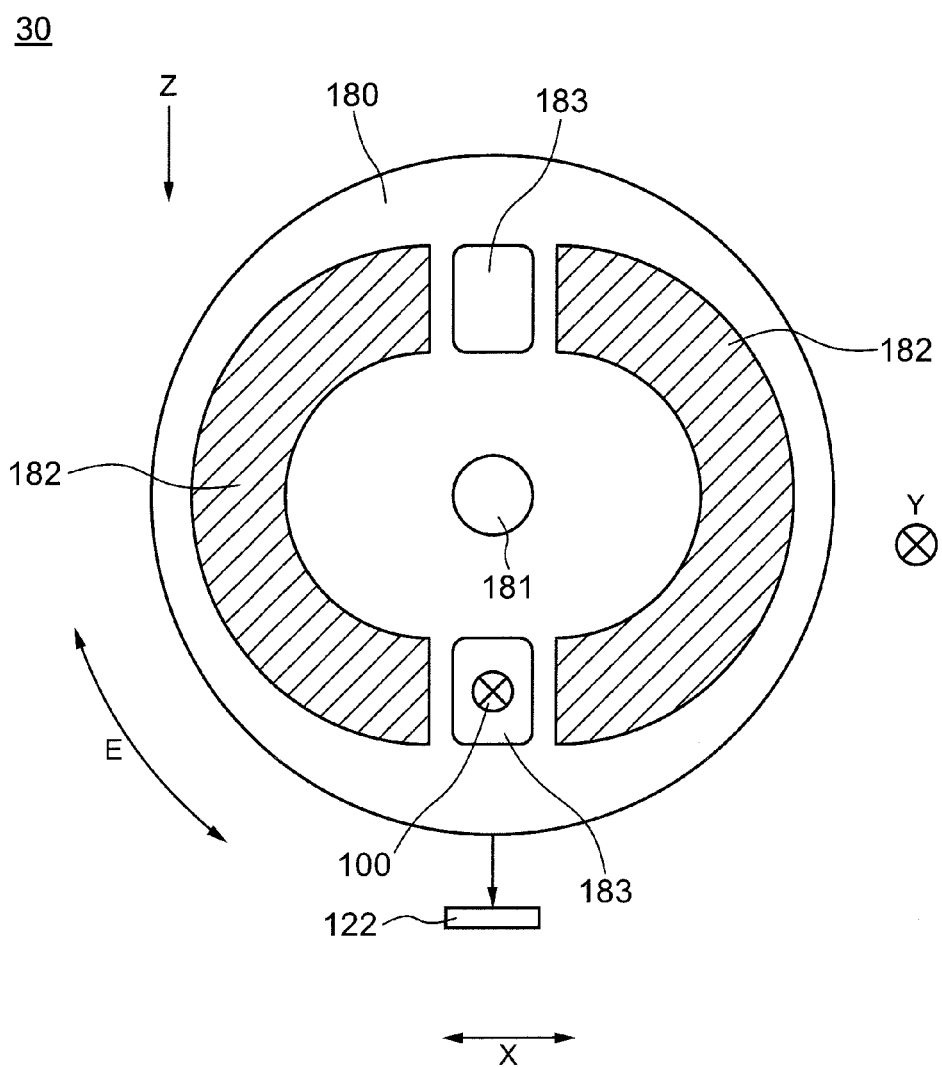
FIG. 15A is a schematic view illustrating a fourth embodiment of an optical pickup in the optical information recording/reproducing apparatus according to the present invention.
Figure 15B:
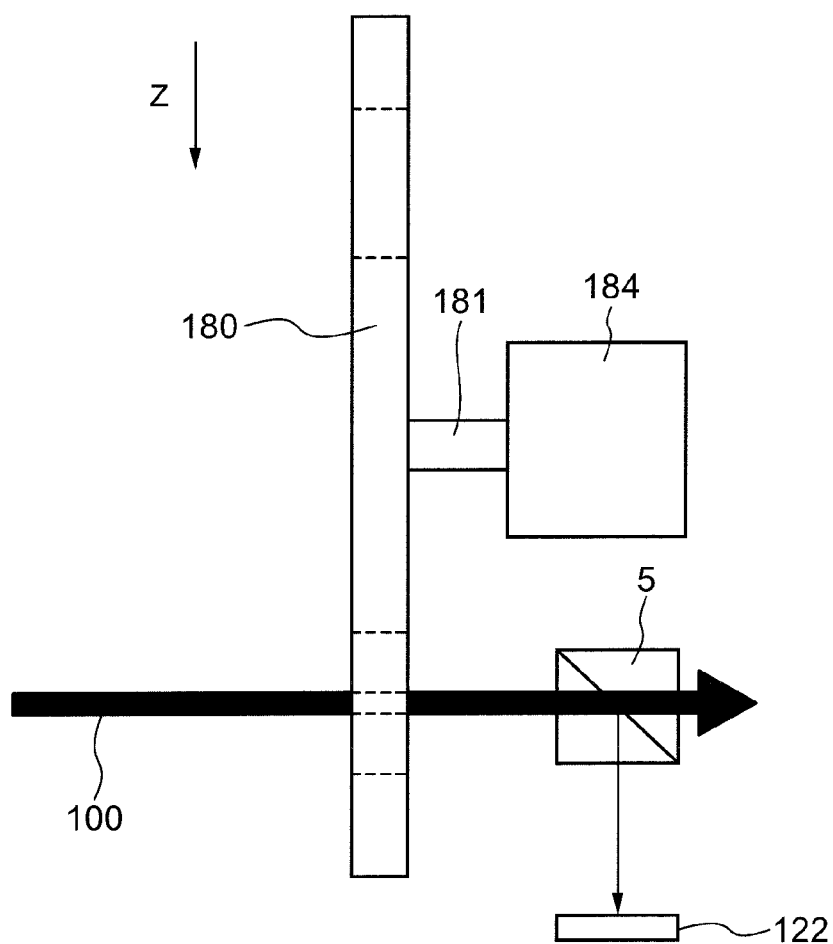
FIG. 15B is a schematic view illustrating the fourth embodiment of the optical pickup in the optical information recording/reproducing apparatus according to the present invention.

Here, FIG. 15A is a diagram of the liquid crystal shutter of the present invention viewed in the irradiating direction of the light beam, that is, in the Y direction, and FIG. 15B is a diagram in which FIG. 15A is viewed from a right side thereof, that is, in the X direction.

In addition, here, the shutter part 30 being the liquid crystal shutter unit is the liquid crystal shutter of the present invention, and includes a liquid crystal element portion 182, a disc-like base 180 being a base of the liquid crystal element, and through holes 183 bored in the base 180. Here, the apparatus may have a configuration in which the light beam passes directly through the through holes 183, rather than the liquid crystal element portion 182 when it does not matter if the light beam is applied without passing through the liquid crystal shutter, like at the time of reproducing, for example, also for the enhancement of longevity of the liquid crystal shutter, and the shutter part 30 being the liquid crystal shutter unit can rotate or turn in a direction of an arrow E with respect to a rotating shaft 181. Reference numeral 184 denotes an actuator for rotating or turning the shutter part being the liquid crystal shutter unit about the rotating shaft 181. Reference numeral 122 denotes, as with the above description, a sensor for detecting whether or not the shutter performs a predetermined operation, or detecting the deterioration state of the liquid crystal shutter.

Here, in the reproducing mode shown in FIG. 7, the method of causing the light beam 100 to pass through the through holes may be employed, as shown in FIGS. 15A and 15B.

Figure 16A:
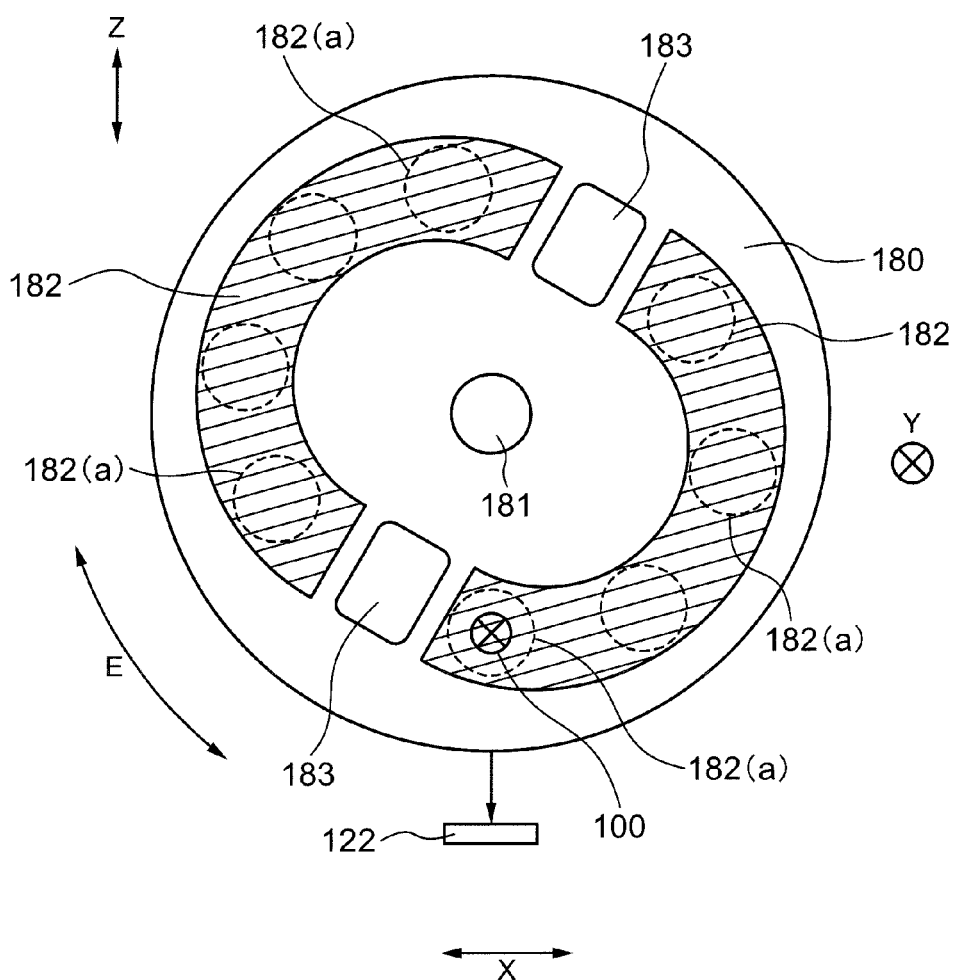
FIG. 16A is a schematic view illustrating the fourth embodiment of the optical pickup in the optical information recording/reproducing apparatus according to the present invention.
Figure 16B:
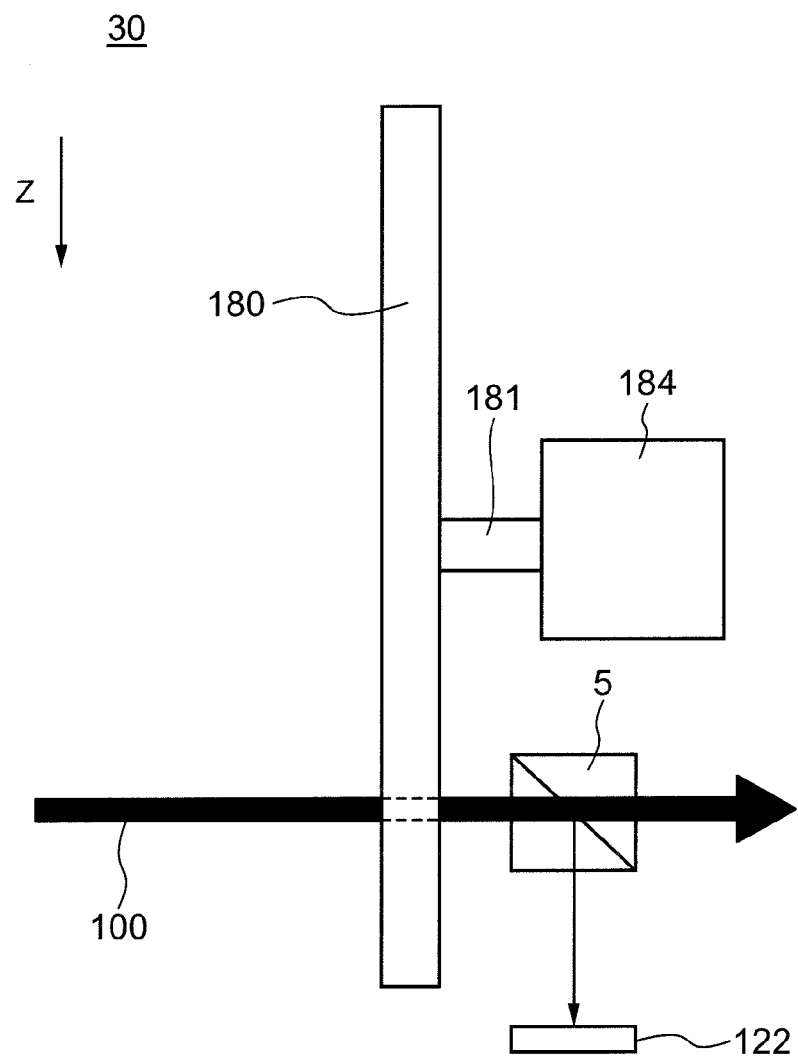
FIG. 16B is a schematic view illustrating the fourth embodiment of the optical pickup in the optical information recording/reproducing apparatus according to the present invention.

FIGS. 16A and 16B are diagrams of the case where the base 180 is rotated about the rotating shaft 181 in the direction of the arrow E, in FIGS. 15A and 15B. The light beam 100 is applied to the liquid crystal element 182, and the operation is performed according to the modes shown in FIG. 7, FIG. 8, and FIG. 9. In addition, in FIGS. 16A and 16B, dotted lines of reference character 182(a) schematically illustrate regions where the liquid crystal shutter 182 is damaged under influence of the light beam. In the present invention, FIG. 16A shows an example in which a step (an interval of an rotation angle) from one irradiation region having deteriorated by the light beam to the next irradiation region is set at such an interval or more as perimeters of the regions 182(a) where the liquid crystal shutter 182 will be damaged do not overlap with each other.

In addition, also in the fourth embodiment, there has been described the example in which the liquid crystal portions having deteriorated by the light beam are not reused, but the present invention is not limited thereto. If the state of the surface of the liquid crystal can be recovered by any method of refreshing the once-deteriorated surface over time, or refreshing the liquid crystal, the deterioration state is detected, and the surfaces may be reused in a circulating manner unless one irradiation region of the light beam is continuously used.

In addition, in the first to fourth embodiments described above, there has been described the method in which, when a region on the liquid crystal shutter to which the light beam is applied cannot function, the surface of the liquid crystal shutter is moved to the next unused region, but the present invention is not limited thereto. The whole liquid crystal may be used keeping the state thereof to uniformly deteriorate by moving one region of the liquid crystal to the next region when the degree of damage reaches, for example, 30 to 50%, before the one region becomes completely unavailable, and by returning the first region to the position to which the light beam is applied when the regions pass around.

In addition, in the first to fourth embodiments described above, there has been described the mode in which the liquid crystal shutter is moved with respect to the light beam, but the present invention is not limited thereto. A mode (not shown) may be employed in which the liquid crystal shutter side is fixed, and the light beam side is relatively moved. With regard to this, for example, if the surrounding environment for placing the apparatus is a place where vibration occurs much, the light beam 100 shown in FIG. 1 may be shifted vertically, horizontally, or back and forth, with respect to the plane of paper. At such a point, an apparatus having tolerance to misregistration of the light beam due to the vibration can be realized by making a system (not shown) control the positions of the laser light source 1, the optical systems 2 and 11, the prisms 5, 6, and 12 at the same time.

In addition, in the first to fourth embodiments described above, there have been described the case in which there are only two patterns of the state of the liquid crystal shutter, that is, ON (shielding) and OFF (transmitting), but the present invention is not limited thereto. A mode may be employed in which a transmission rate thereof is changed continuously or in stages to 30% shielding for example, under the control of voltage or frequency. With regard to this, for example, if the output of the laser light (light beam) is raised for some reason, the control may be performed by controlling the transmission rate of the liquid crystal shutter, rather than performed by the light-source driving circuit 382 of the laser (FIG. 4). In this case, the shutter controlling circuit 387 (FIG. 4) may have a function of controlling the transmission rate. This configuration has an advantage in that a laser having characteristics sensitively influenced by temperature, for example, can be handled by the liquid crystal shutter, which is easy to control. In addition, for example, in the case where response of the laser output is slow with respect to a laser input condition such as a power and it requires a lot of time to stabilize the laser, the laser light passes through the liquid crystal shutter that is quick in responding and has a variable transmission rate, which allows for the control for enhancing the responsivity of light power.

Still further, the ON and OFF of the liquid crystal shutter does not have to be controlled over the entire surface of the liquid crystal element at the same time, and for example, with reference to FIG. 4, the control may be performed for each area in the liquid crystal shutter 4 (areas shown by hexagons of dotted-lines in FIG. 4) to which the laser light is applied, so as to achieve power saving in driving the liquid crystal shutter. In addition, the control of the liquid crystal is performed for each limited area to which the laser light is applied, which provides an advantage of achieving the enhancement of longevity for unused regions in the liquid crystal element.

In addition, in the first to fourth embodiments described above, there has been described the method in which the detection of the light passing through the liquid crystal shutter by the sensor 122 (FIG. 1), the present invention is not limited thereto. A method may be used in which when a laser having a predetermined output is output from the laser light source 1, the light intensity is detected by using the camera 14 to detect the state (deterioration state) of the liquid crystal shutter. With this method, reduction of the number of components, downsizing of the apparatus, and reduction of the cost can be achieved.

Still further, if the liquid crystal shutter has to be ON (shielding state) for a long time when an attempt to improve the deterioration of the liquid crystal element due to the laser irradiation is made as much as possible, the apparatus may have a configuration in which a physical douser, for example, a metal plate, a resin plate or the like having an antireflection agent applied thereto is inserted, as the optical pickup device 200, on the laser light source side upstream of liquid crystal shutter 4a, so as to prevent unnecessary laser light from being applied to the liquid crystal shutter.

In the first to fourth embodiments described above, there has been described the case, as one example, where the optical information recording/reproducing apparatus using holography is applied to an optical information recording/reproducing apparatus using an angular multiplexing recording and/or reproducing method, but the application scope of the present invention is not limited thereto, and the present invention can be applied to, for example, an optical information recording/reproducing apparatus using a monocular optical system, an optical information recording/reproducing apparatus using a shift multiplexing recording method including a collinear method, and an optical information recording/reproducing apparatus using a microhologram method in which a signal beam and a reference beam are applied to a disc being a recording medium.

In addition, in the first to fourth embodiments according to the present invention, there has been described an example where the liquid crystal shutter is disposed at a position of a stage prior to branching in the signal beam and the reference beam, but the optical information recording/reproducing apparatus may be configured to dispose the liquid crystal shutter, for example, on the front side of the photodetector (camera), for example, to make the liquid crystal shutter function as a shutter for the photodetector (camera). In addition, at this point, a layout may be employed where the optical sensor 122 is disposed paring with the liquid crystal shutter.

In addition, in the first to fourth embodiments according to the present invention, there has been described an example where the liquid crystal shutter is disposed at a position of a stage prior to branching in the signal beam and the reference beam, but the liquid crystal shutter may be disposed closer to the laser light source than the optical system 2 shown in FIG. 1, and the apparatus may have a configuration in which the laser light source and a shutter part being the shutter unit formed by the liquid crystal shutter are included and integrated in one laser unit.

In addition, in the first to fourth embodiments according to the present invention, the optical information recording/reproducing apparatus may urge a user to change the liquid crystal shutter by using alerting means (a warning lamp, a warning alarm, or ejecting a disc from the apparatus) or the like (not shown) if it is determined that there is no regions that have not deteriorated on the liquid crystal shutter, that is, the shutter part reaches the end of life thereof. Here, as the detection method of whether or not the liquid crystal reaches the end of life thereof may be defined by storing the positions of the used liquid crystals to detect whether or not there is no remaining areas, or may be defined by changing the position of the liquid crystal shutter in the state where the power of the optical information recording/reproducing apparatus is ON and the light beam is emitted, detecting whether or not the transmission rate or the like of the light beam is within a predetermined range by the abovementioned sensor 122 or the like, and determining the end of life based on the determination that there is no region having the transmission rate or the like within the predetermined range.

In addition, in the first to fourth embodiments according to the present invention, there has been described the example in which the liquid crystal shutter using the liquid crystal element is used for as the shutting function, but the present invention is not limited thereto, and the shutting function can be provided also by using transparent electronic paper (transparent conductive film). In addition, using the electronic paper also provides an advantage of achieving low power consumption because, light-and-dark state of the electronic paper is changed only when voltage is applied or changed, and the maintenance of the ON state (light state or transparent state) or the maintenance of the OFF state (dark state or shielding state) does not consume power. However, since the deterioration by the irradiation of the laser light cannot be avoided even when the electronic paper is used for the shutting function, as with the case of using the liquid crystal element, the laser irradiated position has to be relatively moved with respect to the electronic paper based on the deterioration state of the electronic paper, in order to secure the performance.

In addition, in the present embodiment, there has been described the case where the shutting function of the present invention is applied to an optical information recording apparatus and/or an optical information recording/reproducing apparatus, but the application scope is not limited thereto, and the present invention can be applied also to a shutter configuration of a digital camera or the like that requires high-speed, high-reliability, and highly-stabilized characteristics, or a machine tool, an exposure device or the like using the laser light source.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording/reproducing apparatus for recording information on a recording medium and/or reproducing information from the recording medium, the optical information recording/reproducing apparatus comprising:
   a laser light source for performing recording and/or reproducing;
   a shielding part that can switch between transmission and interception of laser light emitted from the laser light source;
   a driving circuit for driving the switching between transmission and interception of the shielding part;
   a moving part for relatively moving the shielding part and the laser light; and
   a controlling circuit for controlling the moving part,
   wherein the moving part relatively moves the shielding part and the laser light so as to switch a region to which the laser light is applied from a first region of the shielding part to a second region thereof different from the first region; and
   wherein a liquid crystal element is used as the shielding part.

2. The optical information recording/reproducing apparatus according to claim 1, further comprising a detecting part for monitoring a state of the shielding part, wherein
   the moving part relatively moves the shielding part and the laser light based on a result from the detecting part.

3. The optical information recording/reproducing apparatus according to claim 1, wherein the moving part moves the shielding part.

4. The optical information recording/reproducing apparatus according to claim 1, wherein the moving part moves an optical axis of the laser light.

5. The optical information recording/reproducing apparatus according to claim 1, wherein an initial position of the laser light relative to the shielding part is a substantially center portion of the shielding part.

6. The optical information recording/reproducing apparatus according to claim 2, wherein the detecting part is a detector that can detect laser light, and/or a detector that can detect a deterioration state of the shielding part.

7. The optical information recording/reproducing apparatus according to claim 2, wherein the detecting part is a device for monitoring a period of irradiation time of laser light.

8. The optical information recording/reproducing apparatus according to claim 1, wherein the moving part relatively moves the shielding part and the laser light by rotating the shielding part.

9. The optical information recording/reproducing apparatus according to claim 2, wherein
   the detecting part is a camera for receiving a reproduced beam from the recording medium, and
   the moving part relatively moves the shielding part and the laser light based on a result from the camera.

10. The optical information recording/reproducing apparatus according to claim 2, wherein the detecting part detects transmitted light from the shielding part, and
    a deterioration state of the shielding part is determined from the transmitted light, and the moving part relatively moves the shielding part and the laser light based on the determination result.

11. The optical information recording/reproducing apparatus according to claim 3, wherein the moving part two-dimensionally moves the shielding part in a direction perpendicular to an optical axis of the laser light.

12. The optical information recording/reproducing apparatus according to claim 2, wherein the shielding part has a substantially rectangular shape or an arc shape.

13. The optical information recording/reproducing apparatus according to claim 10, wherein if the light intensity of the transmitted light detected by the detecting part is equal to or less than a prescribed value when the shielding part can transmit the laser light, the shielding part is determined to have deteriorated and the moving part relatively moves the shielding part and the laser light.

14. The optical information recording/reproducing apparatus according to claim 10, wherein if the light intensity of the transmitted light detected by the detecting part is equal to or more than a prescribed value when the shielding part intercepts the laser light, the shielding part is determined to have deteriorated and the moving part relatively moves the shielding part and the laser light.

15. An optical information apparatus for recording information on a recording medium and/or reproducing information from the recording medium, the optical information recording/reproducing apparatus comprising:

a laser light source for performing recording and/or reproducing;

a shielding part that can switch between transmission and interception of laser light emitted from the laser light source by electrically changing a transmission rate of the shielding part;

a driving circuit for driving the switching between transmission and interception of the shielding part;

a moving part for relatively moving the shielding part and the laser light; and a controlling circuit for controlling the moving part, wherein the moving part relatively moves the shielding part and the laser light so as to switch a region to which the laser light is applied from a first region of the shielding part to a second region thereof different from the first region.

16. The optical information apparatus according to claim 15, wherein the shielding part is an electronic paper or a liquid crystal device.

* * * * *